(12) United States Patent
Silver

(10) Patent No.: US 12,302,218 B2
(45) Date of Patent: May 13, 2025

(54) VEHICLE-TO-EVERYTHING (V2X), VEHICLE-TO-VEHICLE (V2V) AND VEHICLE-TO-INFRASTRUCTURE (V21) POLICY FOR MANAGING DISTRACTED DRIVING

(71) Applicant: TANGO NETWORKS, INC., Frisco, TX (US)

(72) Inventor: Andrew Silver, Frisco, TX (US)

(73) Assignee: TANGO NETWORKS, INC., Frisco, TX (US)

( * ) Notice: Subject to any disclaimer, the term of this patent is extended or adjusted under 35 U.S.C. 154(b) by 280 days.

(21) Appl. No.: 17/863,358

(22) Filed: Jul. 12, 2022

(65) Prior Publication Data

US 2022/0353789 A1 Nov. 3, 2022

Related U.S. Application Data

(63) Continuation of application No. 16/897,228, filed on Jun. 9, 2020, now Pat. No. 11,388,649, which is a
(Continued)

(51) Int. Cl.
| | |
|---|---|
| *H04W 4/02* | (2018.01) |
| *B60W 50/14* | (2020.01) |
| *G08G 1/0965* | (2006.01) |
| *G08G 1/0967* | (2006.01) |
| *G08G 1/16* | (2006.01) |
| *H04L 43/16* | (2022.01) |
| *H04W 4/021* | (2018.01) |

(Continued)

(52) U.S. Cl.
CPC ............ *H04W 48/04* (2013.01); *B60W 50/14* (2013.01); *G08G 1/0965* (2013.01); *G08G 1/096716* (2013.01); *G08G 1/096741* (2013.01); *G08G 1/09675* (2013.01); *G08G 1/096775* (2013.01); *G08G 1/096783* (2013.01); *G08G 1/096791* (2013.01); *G08G 1/161* (2013.01); *H04L 43/16* (2013.01); *H04W 4/021* (2013.01); *H04W 4/027* (2013.01); *H04W 4/40* (2018.02); *H04W 12/64* (2021.01); *H04W 36/322* (2023.05); *H04W 88/16* (2013.01); *H04L 67/12* (2013.01); *H04W 12/08* (2013.01); *H04W 12/61* (2021.01)

(58) Field of Classification Search
CPC ............................... H04W 48/24; H04W 4/40
See application file for complete search history.

(56) References Cited

U.S. PATENT DOCUMENTS

| | | |
|---|---|---|
| 8,611,928 B1 | 12/2013 | Bill |
| 8,712,429 B2 | 4/2014 | Nagorniak |

(Continued)

*Primary Examiner* — Michael T Vu

(57) ABSTRACT

Disclosed are a system and method of regulating access to devices that can distract a driver that is operating a motor vehicle based on received Vehicle-to-Everything communications including Vehicle-to-Vehicle and Vehicle-to-Infrastructure information. One example method may include determining a vehicle is approaching a vehicle movement restriction location requiring a vehicle movement restriction, determining an amount of time associated with the vehicle movement restriction, and determining whether a device located inside the vehicle will be made accessible to a user during the vehicle movement restriction based on the amount of time associated with the vehicle movement restriction.

18 Claims, 16 Drawing Sheets

Related U.S. Application Data continuation of application No. 15/701,882, filed on Sep. 12, 2017, now Pat. No. 10,681,613.

(51) Int. Cl.
*H04W 4/40* (2018.01)
*H04W 12/64* (2021.01)
*H04W 36/32* (2009.01)
*H04W 48/04* (2009.01)
*H04W 88/16* (2009.01)
H04L 67/12 (2022.01)
H04W 12/08 (2021.01)
H04W 12/61 (2021.01)

(56) References Cited

U.S. PATENT DOCUMENTS

| | | |
|---|---|---|
| 9,615,213 B2 | 4/2017 | Tibbitts et al. |
| 10,284,709 B2 | 5/2019 | Miller et al. |
| 11,021,164 B2 * | 6/2021 | Tibbitts ............... G07C 5/0808 |
| 2012/0268235 A1 | 10/2012 | Farhan et al. |
| 2014/0199988 A1 | 7/2014 | Nagorniak |
| 2014/0364108 A1 | 12/2014 | Tibbitts et al. |
| 2016/0353355 A1 | 12/2016 | Tibbitts et al. |
| 2017/0132483 A1 * | 5/2017 | Salomonsson ....... G06V 20/584 |
| 2018/0158329 A1 * | 6/2018 | Benhammou ............ G08G 1/07 |
| 2018/0183923 A1 | 6/2018 | McSchooler |
| 2019/0272760 A1 | 9/2019 | McQuillen et al. |
| 2020/0084314 A1 * | 3/2020 | Mahar .................. H04W 4/021 |

\* cited by examiner

680

VEHICLE-TO-EVERYTHING (V2X), VEHICLE-TO-VEHICLE (V2V) AND VEHICLE-TO-INFRASTRUCTURE (V2I) POLICY FOR MANAGING DISTRACTED DRIVING

CROSS-REFERENCE TO RELATED APPLICATIONS

This application is a continuation of U.S. patent application Ser. No. 16/897,228, filed on Jun. 9, 2020, now U.S. Pat. No. 11,388,649, which is a continuation of U.S. patent application Ser. No. 15/701,882, filed on Sep. 12, 2017, now U.S. Pat. No. 10,681,613, issued on Jun. 9, 2020, the entire contents of which are hereby incorporated by reference.

This application is further related to U.S. patent application Ser. No. 14/188,970, entitled "CONTROLLING MOBILE DEVICE CALLS, TEXT MESSAGES AND DATA USAGE WHILE OPERATING A MOTOR VEHICLE", filed on Feb. 25, 2015, issued as U.S. Pat. No. 9,439,133 on Sep. 6, 2016, which is a continuation of U.S. patent application Ser. No. 13/096,827, entitled "CONTROLLING MOBILE DEVICE CALLS, TEXT MESSAGES AND DATA USAGE WHILE OPERATING A MOTOR VEHICLE", filed on Apr. 28, 2011, issued as U.S. Pat. No. 8,666,382 on Mar. 4, 2014 which is related to and claims the benefit of U.S. provisional patent application 61/328,689 entitled "System and method for controlling mobile telephone calls, text messages and mobile data while driving a motor vehicle", filed on Apr. 28, 2010, the entire contents of each are hereby incorporated by reference.

TECHNICAL FIELD OF THE INVENTION

This invention relates to a method and apparatus of controlling devices accessible by a driver while operating a motor vehicle, and, more specifically, to monitoring and controlling usage restrictions while the motor vehicle is being operated.

BACKGROUND OF THE INVENTION

Operating an in-vehicle or mobile device while driving can distract the driver of a motor vehicle (i.e. transport vehicle). An in-vehicle or vehicle device may include an 'infotainment' screen (front driver-accessible or driver-visible), or for rear passengers (non-driver accessible or driver-visible or other designations) that could be used for controlling audio and visual entertainment, such as a radio, video or navigation or a control system for climate, and other vehicle features or also a heads-up display (HUD), which may provide information projected onto the driver windshield that could include speed, engine and systems information, navigation and/or infotainment information. A mobile device may include any mobile device capable of establishing communications with a network, such as a cell phone, tablet computing device, laptop, smart phone, etc. Certain concerns have been raised to restrict drivers from using distracting devices while the vehicle is in motion. One example of such restrictions may include local laws and ordinances that have been imposed on drivers that make it illegal to utilize a mobile device while driving. Other laws simply limit the usage of distracting devices while traversing certain restricted areas (e.g., a school zone).

In order to enforce such legal regulations related to mobile devices, local law enforcement must observe a driver committing an infraction and subsequently impose a fine on the driver. Such a method of law enforcement can be considered a passive method for controlling the device, since it is the driver's responsibility to restrict usage of the mobile device. This can be a problem since the law cannot be easily enforced, and thus the user will not stop using the mobile device while operating their motor vehicle.

Current methods for addressing these issues rely on device-based solutions, rather than network-based solutions. For example, device-based solutions are typically custom-designed for the device and/or the vehicle and are typically expensive to implement or require the use of a "smartphone"— a mobile telephone with an operating system onto which third party software can be deployed, and which has access to a global positioning system (GPS) receiver as well as additional wireless protocols such as BLUETOOTH and/or WIFI.

Examples of conventional vehicle tracking systems are used by delivery companies such as UPS® and FedEx®. In these systems, vehicles are equipped with proprietary mobile devices that must be placed in a proprietary docking station inside the vehicle in order for the vehicle to be placed in motion. When in motion, the devices impose limitations on their usage, such as preventing the driver from reading certain information screens while the vehicle is in motion to prevent driver distractions originating from the mobile device.

Other examples may include solutions from third party vendors that deploy software on a specific smartphone mobile device, such as an Android®, Apple iPhone®, RIM Blackberry®, or Windows Mobile device, etc. In these examples, the software accesses the device-based GPS to identify when the device is moving at a certain velocity (e.g. >5 mph), at which point the device restricts the use of text messages and or calls from being accessed via the mobile device.

While both of these types of solutions are technically feasible, they face significant hurdles to adoption, including cost, difficulty of use, and restrictions on which devices can be used (e.g., only certain smartphones from certain carriers). Other concerns include identifying when the user is actually in the vehicle and when the individual is in command of the vehicle, and providing safeguards that prevent a user from circumventing the system.

SUMMARY OF THE INVENTION

One embodiment of the present invention may include a method of regulating mobile device communications while operating a motor vehicle. The method may include determining a speed event indicating that a speed of the motor vehicle has performed at least one of exceeded a first threshold above which mobile device usage restriction policies are invoked and fallen below a second threshold allowing the mobile device restriction policies to be removed. The first threshold is equal to or greater than the second threshold. The method may also include transmitting the speed event to a remote edge gateway server located remotely from the motor vehicle, and storing the speed event in the remote edge gateway server.

Another example embodiment of the present invention may include a system configured to regulate mobile device communications while operating a motor vehicle. The system may include an edge gateway server configured to determine a policy associated with a speed event indicating that a speed of the motor vehicle has performed at least one of exceeded a first threshold above which mobile device usage restriction policies are invoked and fallen below a second threshold allowing the mobile device restriction policies to be removed. The first threshold is equal to or greater than the second threshold. The apparatus may also include a transmitter device configured to obtain and transmit the speed event to a remote edge gateway server located remotely from the motor vehicle, the remote edge gateways server comprising memory configured to store the speed event in the remote edge gateway server.

According to yet another example embodiment, a vehicle may receive V2V (Vehicle to Vehicle) information and make determinations via a processing device associated with the vehicle. This method may include at least one of receiving V2V information at a device disposed in a vehicle in motion operated by a driver, and processing the V2V information received with previously received V2V information. The method may also include determining the V2V information received has exceeded a threshold based on a comparison between the received V2V information and the previously received V2V information, and responsive to determining the V2V information has exceeded the threshold, applying a restriction policy on at least one user device located inside the vehicle. The new V2V information may indicate an increase in traffic, speed, etc., that the previously known V2V information did not indicate, which may cause a change in policy. The device is different from at least one user device. For example, the device may be a vehicle device as part of the vehicle. The vehicle device may also be the same as the user device.

In another example embodiment, a method may include at least one of determining a vehicle is approaching a vehicle movement restriction location requiring a vehicle movement restriction, such as a traffic light or construction zone, and determining an amount of time associated with the vehicle movement restriction, and determining whether a device located inside the vehicle will be made accessible to a user during the vehicle movement restriction based on the amount of time associated with the vehicle movement restriction. A decision may be made based on known parameters, known rules and applied logic to restrict the user device usage completely, partially and/or for a fixed period of time. The traffic restriction location may include a construction zone, a traffic light, a school zone, a designated low speed environment and a designated danger zone. The method may also include determining the vehicle is approaching the vehicle movement restriction location by determining a vehicle position via a global positioning system (GPS) location determination and/or a proximity between the traffic light and the vehicle. The method may also provide determining the amount of time is above a threshold amount of time, and responsive to determining the amount of time is above the threshold amount of time, providing limited access to the user device, determining the amount of time is above a threshold amount of time, and responsive to determining the amount of time is below the threshold amount of time, providing no access to the user device. The limited access to the user device includes at least one of a limited time window to receive and access communication messages including at least one of e-mail messages, short message service messages, multimedia message service, social media, vehicle infotainment or system and device application messages. The method may also include determining the vehicle movement restriction location comprises a known dangerous condition, and responsive to identifying the known dangerous condition, providing limited access to the device. The method may also include determining the vehicle movement restriction location comprises a known dangerous condition, and responsive to identifying the known dangerous condition, providing alert messages to the device.

Still yet another example embodiment may provide a method that includes at least one of determining a vehicle is moving on a roadway, receiving V2V information at a vehicle device, located inside the vehicle, from a plurality of other vehicles moving on at least one of the roadway and an adjacent roadway, determining a magnitude of traffic on at least one of the roadway and the adjacent roadway is exceeding a traffic threshold, and restricting a user device located inside the vehicle during the vehicle movement responsive to the magnitude of traffic exceeding the traffic threshold.

Still another example embodiment may include a method that provides at least one of determining a vehicle is moving on a roadway, receiving V2I (Vehicle to Infrastructure) information at a vehicle device, located inside the vehicle, determining a vehicle is approaching a vehicle movement restriction location requiring a vehicle movement restriction, determining an estimated restriction time window associated with the vehicle movement restriction location comparing the estimated restriction time window to a plurality of restriction threshold levels, determining the restriction time window exceeds one of the restriction threshold levels and does not exceed one other of the restriction threshold levels, and partially restricting usage of a user device located inside the vehicle for at least a portion of the restriction time window. The method may also include determining whether a driver profile associated with the driver imposes additional restrictions, and when the driver profile imposes additional restrictions, further restricting the partially restricted usage of the user device. Also, the further restricting the partially restricted usage of the user device further includes restricting device usage to only one of multiple devices available to the user in the vehicle and restricting the usage to one or more predefined functions comprising navigation applications, emergency services notifications and emergency calling.

Still another example embodiment may include a method that includes at least one of receiving V2V information at a vehicle device disposed in a vehicle in motion operated by a driver, the V2V information is received from one or more of a plurality of other vehicles within a predefined distance of the vehicle, processing the V2V information received, determining the V2V information received indicates a plurality of alerts associated with the plurality of other vehicles, applying a restriction policy to at least one user device located inside the vehicle based on the plurality of alerts. The plurality of alerts include at least one of a threshold amount of vehicle traffic identified by one or more of the plurality of other vehicles, a construction site identified by one or more of the plurality of other vehicles, and an emergency condition identifying by one or more of the plurality of other vehicles.

Yet still a further example embodiment may include a method that includes receiving V2P information at a vehicle device disposed in a vehicle in motion operated by a driver, wherein the V2P information is received from one or more of a plurality of pedestrian devices within a predefined distance of the vehicle, processing the V2P information received, determining the V2P information received indicates an updated pedestrian safety condition associated with the one or more of the plurality of pedestrians, and applying a restriction policy to at least one user device located inside the vehicle based on the updated pedestrian safety condition. The updated pedestrian safety condition may include at least one of a recent pedestrian appearance, such as a non-vehicle based pedestrian that recently entered an intersection associated with the vehicle device position.

DETAILED DESCRIPTION OF THE APPLICATION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments of the present invention may include a method to control the use of a mobile device during the operation of a motor vehicle. The controlling may include limited access to dialing calls, transmitting and/or receiving text messages and/or transferring other mobile data while operating the motor vehicle. A motor vehicle may be referred to synonymously with transport vehicle or transport means, such as an automobile, motorcycle, truck, bus, boat, train, aircraft, all-terrain vehicle (ATV), etc.

According to other embodiments of the present invention, a method is disclosed to enable an active responsible driver system (RDS) solution to control mobile devices when a user has established certain predefined criteria, such as being in command of a vehicle in motion, and/or traversing a specific area requiring usage restrictions.

Figure 1:
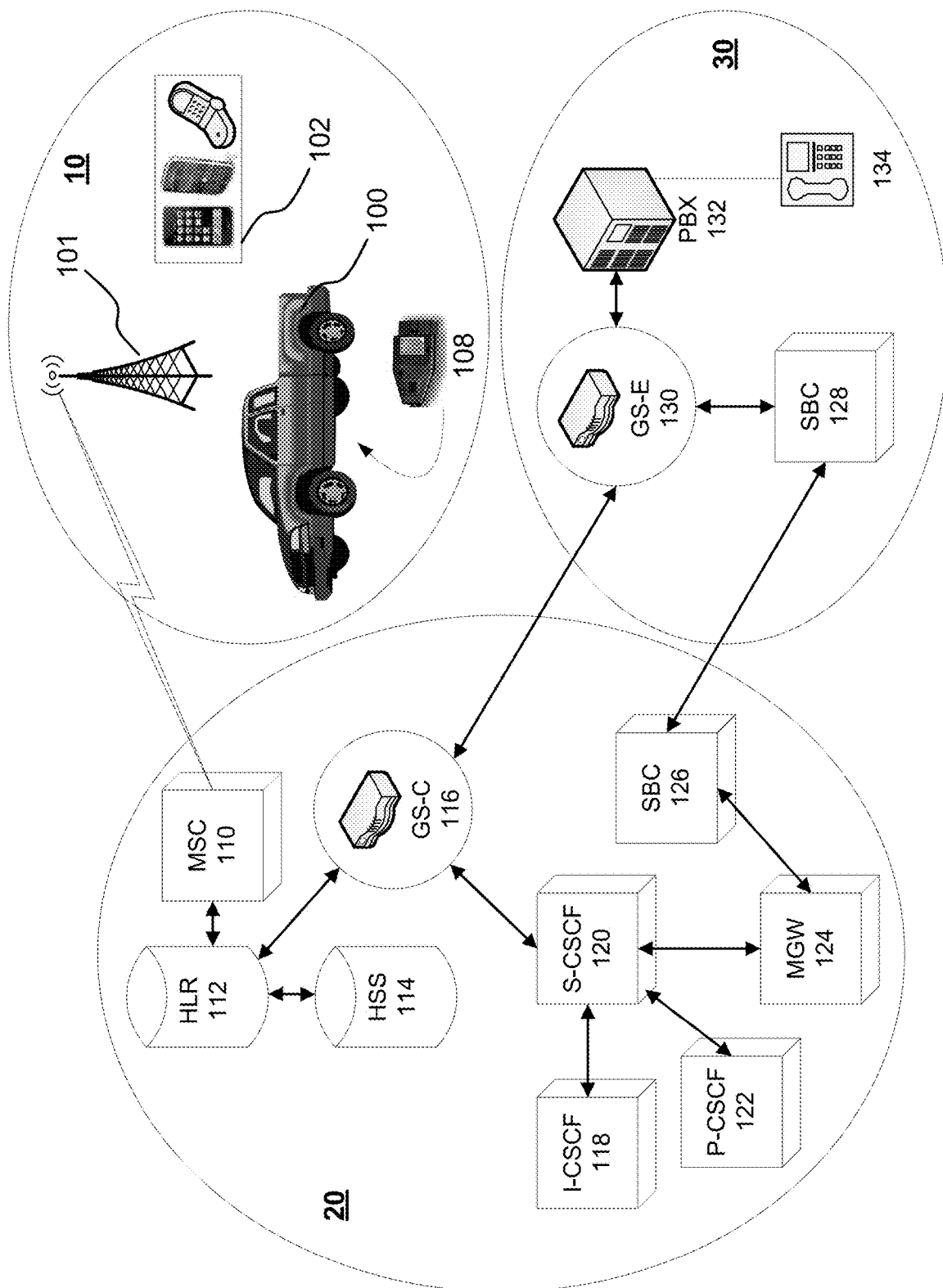
FIG. 1 illustrates an example network configuration, according to example embodiments of the present invention.

FIG. 1 illustrates a mobile network and related communication system corresponding to example embodiments of the present invention. Referring to FIG. 1, an operating network area of a mobile device 10 is illustrated as being in communication with a mobile network 20 and an enterprise network 30. A mobile device 102 may have a subscription to a mobile service on the mobile network 20 operated by a mobile telephone network service provider and/or service carrier. The mobile device may be a smartphone, cell phone, tablet computing device, or other device capable of communicating with a cellular infrastructure (i.e., base station 101).

The mobile device 102 may maintain a subscription for service on the mobile telephone network service provider's network 20. The subscription may be provisioned and stored in memory in the carrier's home location register (HLR) 112 and/or a home subscriber server (HSS) 114. Such subscription information may include the subscription information for enabling mobile device calls to be originated and terminated, text messages to be originated and terminated, and for mobile data to be requested and delivered.

To control the mobile device 102, the mobile subscriber's profile stored in the HLR 112/HSS 114 is activated accessed prior to, or when a call attempt or text message is originated or terminated with the mobile device 102. In the case of a call, the mobile switching center (MSC) 110 or call session control function (i.e., interrogating—I, servicing—S, and proxy—P-CSCFs) 118-122, verify the subscriber profile from the HLR and/or HSS to determine the services of the subscriber. In an IP multimedia system (IMS) network, the S-CSCF obtains the initial filter criteria (IFC) information which may instruct the S-CSCF to query a session initiation protocol (SIP) application server (SIP-AS) represented by 116 before routing a session. Similarly, in a circuit-switched network, the MSC 110 obtains the trigger information which may instruct the MSC 110 to query a service control point (SCP) represented by 116 before routing a call. The SCP or SIP-AS 116 may then analyze the origination and/or termination information and apply logic to instruct the MSC 110 or S-CSCF 120 on how to route the call, session or text message. The SCP or SIP-AS 116 can be split between two nodes, in this case the carrier gateway server 116 and the edge gateway server 130 which may be located in an external network such as an enterprise.

A call that is originated from or terminated to the mobile device 102 may have an alternative treatment applied based on a service condition. For example, a call may be allowed or disallowed or re-routed in response to the service condition. Similarly, the call may be intercepted by the system and stored in memory along with the intended destination if the vehicle is being operated by the user of the mobile device. A call may be augmented with a predefined indication or recorded message to alert the user of the service condition with or without prompting for acknowledgement and/or reason, but still allowing the call to be received. A call may be received and/or a call termination can be re-routed to voicemail or to a recorded message for the calling party (e.g., "the user is unavailable at this time"). A terminating text message can be stored for later delivery to the mobile device 102, an originating text message from the mobile device 102 can be prevented from being delivered, etc.

Mobile data transferred to or from the mobile device 102 may require a mobile data gateway such as a gateway GPRS support node (GGSN) that is connected to a carrier's serving GPRS support node (SGSN), or alternatively, a foreign agent (FA) that is connected to a carrier's Home Agent (HA). For example, a mobile data request transferred from a mobile device 102 can be prevented or delayed from being delivered to a server.

A mobile data response can also be prevented or delayed from being delivered to the mobile device 102. The message may be blocked or intercepted by temporarily storing the message in memory and releasing the message into the network once a predefined condition and/or restriction has passed (e.g., a communication blocked location). In other words, the message may be preserved or just re-routed until certain conditions have been satisfied. Similarly, a mobile data request or response can be augmented with an indication or recorded message to alert the user of the condition with or without a prompting for acknowledgement and/or a reason, but still allow the message to proceed.

According to example embodiments of the present invention, a mobile network may be configured with a gateway server (GS) that can act as a SCP, a SIP-AS and/or a GGSN. The GS is split into two functions, the GS-C 116 located in the carrier network 20 and the GS-E 130 located at the edge of the network, such as in an enterprise or service control network (SCN) 30.

An enterprise may represent a corporation that desires to control the mobile phones of their employees, such as UPS® or FedEx® controlling the mobile phones of their drivers. In such a case, it is possible that the GS-E 130 is also connected to the enterprise voice communications networks including for example, a private branch exchange (PBX) 132 coupled to a telephone device 134, and an IP-PBX and/or unified communications (UC) system. A media gateway (MGW) 124 and SBCs 126 and 128 may provide a communication path to the enterprise network 30. A switched circuit network (SCN) may represent a hosted service provider that offers a service to many small or large corporations for controlling the mobile phones of the corporation's employees. An SCN may also offer such a service to consumers or agencies, for example to enable parents to control the mobile phones of their children, schools to control the mobile devices of their bus drivers, or municipalities or governments to control the use of mobile phones of users that have received infractions for unsafe driving or for using a mobile phone in a school zone.

In other configurations, the GS-E 130 can also be located in the carrier's network 20, or be hosted by a third party in a multi-tenant model that offers the service to many individual enterprises and/or consumers from a single GS-E 130. The GS-C 116 and GS-E 130 can also be combined into a single function allowing the policy and services of the GS-E 130 to be handled by the combined GS (GS-C 116 plus GS-E 130) node.

According to another example embodiment an on-board diagnostic (OBD) system may be used. OBD systems are in most automobiles today. The OBD-II standard was introduced in the mid 1990's, and has been mandated on all automobiles manufactured for sale in the United States since Jan. 1, 1996. The same OBD-II or similar systems are used in most countries around the world.

All OBD-II automobiles have an OBD-II compliant connector located in the passenger compartment that is easily accessible from the driver's seat. This port provides information about the vehicle's state, including malfunction indicators, diagnostic trouble codes and other vehicle information for self-diagnosis and reporting capabilities.

Figure 2:
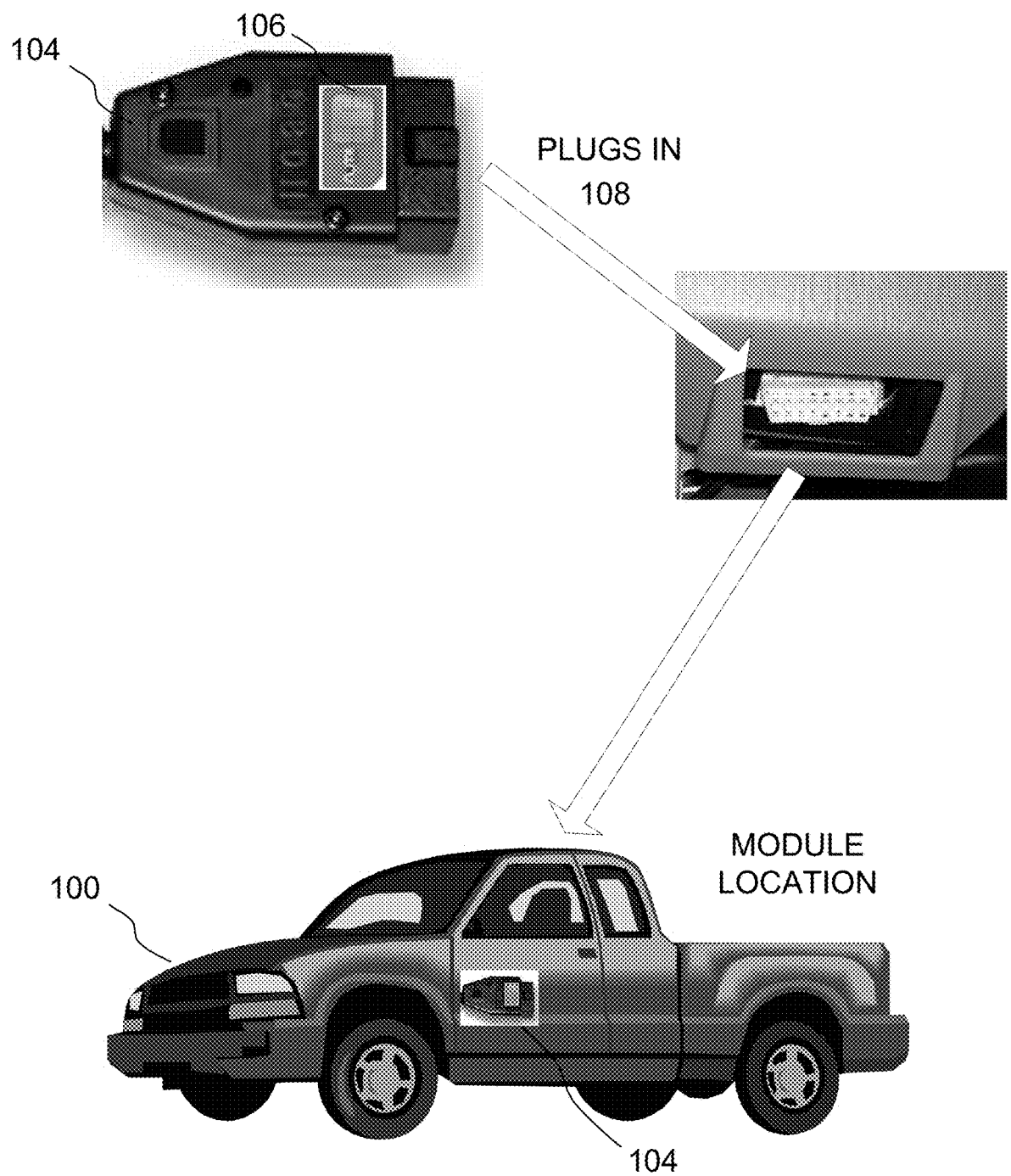
FIG. 2 illustrates an example RDS sensor (RDSS) configuration, according to example embodiments of the present invention.

FIG. 2 illustrates an example OBD and RDS system, according to example embodiments of the present invention. Referring to FIG. 2, a motor vehicle 100 is configured with an OBD interface 108 that is illustrated in detail as being part of the dashboard. The OBD module 104 denoted as the RDS sensor, or RDSS, plugs into the OBD-II connector 108 of the vehicle. The RDSS is capable of obtaining information from various vehicle subsystems in order to identify when the vehicle is on, when the vehicle is in motion, and at what speed the vehicle is traveling.

The RDSS 104 itself may include a system of elements including an OBD-II processor (not shown) for interfacing with the vehicle's OBD-II port 108 via a variety of communication protocols. A corresponding wireless communication system (not shown) may include a radio communications system such as GSM, CDMA, LTE, WiMAX and/or WIFI, which may further include a SIM card 106 for communicating with a mobile network in the case of a GSM mobile network. The system may also include a general computing platform (not shown) for storing program logic for the operation of the RDSS system. The RDSS 104 can be used to send information to and from a server connected over the Internet via the mobile data connection. Data messages may be transmitted via short message service (SMS) text messaging, or via other communication protocols, such as unstructured supplementary services data (USSD), data over voice (DOV) or Internet protocols such as TCP or UDP over mobile data transport. The RDSS may be equipped with a location-determining capability, such as for example assisted GPS (A-GPS), which complies with the U.S. F.C.C. wireless enhanced 911 phase-2 mandate for all mobile phones.

The RDSS 104 may have its own subscriber information module (SIM) card 106, which is compatible with a GSM-based network, a CDMA-based network or other mobile wireless network. In either case, the RDSS represents a separate subscription to the carrier, and may be considered a machine-to-machine (M2M) subscription, which may cost less than a full mobile services subscription for a mobile telephone user. The RDSS subscription is associated with one or more subscribers provisioned in the GS-E 130 that are configured to have their mobile services controlled when they are operating a vehicle in which the RDSS is installed.

The RDSS may be built into automobiles by manufacturers, either as optional equipment or included with all vehicles. The RDSS system is informed when the vehicle is turned on. The RDSS 108 then sends a data notification message to the GS-E 130 associated with the subscriber. This message can be sent over the Internet as a mobile data message, or via SMS or USSD in the case that the RDSS is not capable or configured to support mobile data service.

Note that the message can be sent directly to the GS-E 130, or alternatively, it can be sent to the GS-E 130 via the GS-C 116. In the latter case, the RDSS can be preconfigured to send the message to the GS-C 116 in the carrier network 20, and the GS-C 116 then identifies the corresponding GS-E 130 to which the subscriber belongs. In this example, all RDSSs can be pre-programmed to always route to the carrier's GS-C 116.

On reception of the notification that the vehicle has been turned on, the GS-E 130 may then order the GS-C 116 to obtain the location of the RDSS 108 and the RDS mobile 102. To do this, the GS-C 116 can send a request to the carrier's mobile location center (MLC), which will obtain the location information for each device. The MLC may be part of the MSC 110. On reception of the location information of the devices, the GS-E 130 can then calculate the distance between the two devices to determine if the RDS subscriber 108 is actually located in the vehicle. The distance between the two devices must be less than a predetermined amount to qualify that the RDS subscriber device 102 is within the vehicle. Typically, this would be within a maximum of 300 meters, in compliance with the worst case requirements for E-911 phase-II, but more likely within 5-50 m range.

Note that situations may occur where the RDS subscriber 102 is located inside the vehicle when in fact they are standing outside the vehicle and someone else is driving the vehicle. This would result in the RDS subscriber being subject to RDS policies until the vehicle is driven away and the locations are subsequently re-checked. To reduce and/or eliminate this case, once the vehicle has been determined to be in motion, such that the vehicle has exceeded the hysteresis activation speed (for example, the vehicle may be required to move above a threshold activation speed, such as 15 mph), then the location-determination procedure can be performed a second time. The MLC is again queried for the locations of the RDSS 108 and the RDS mobile 102, and the GS-E 130 can then calculate the distanced between the two devices. If the distance is greater than the previous location determination, then it is likely that the user is not located inside the vehicle. If the distance remains to be less than a maximum of 300 meters apart, then it is likely the user is indeed located inside the vehicle.

Another situation that can occur is that the RDS subscriber 102 may be a passenger in the vehicle and as such is not the driver, but would nevertheless be subject to the RDS policies. In this case the RDS 108 can be overridden to enable the RDS subscriber 102 that is not the driver to be exempt from the RDS policies. Typical methods for overriding the service may be a service code such as "*55" which would be recognized by the GS-C 116 and GS-E 130 even if the RDS user is being subjected to the RDS policies. Similarly, a mobile data or text message could be sent to the GS-E 130 to override the RDS service. Alternatively, the subscriber 102 can be provided with a recorded message with a prompt for input on the voice channel to which they can respond, which may also be achieved via a text message or mobile data prompt. The response from the subscriber 102 can be stored in the network as part of an event record which can be used as evidence or serve as input to a driver scoring algorithm.

In order to reduce the possibility of a driver attempting to override the system, the RDS 108 could require that the override code be sent by two different RDS subscribers, or even by one RDS and one non-RDS subscriber. The second subscriber would typically be the person actually driving the vehicle. In another case, the second person could be a designated administrator such as a parent or supervisor, located outside the vehicle. The RDS subscriber sends the override code to the GS-E 130, and on reception, the GS-E 130 sends a notification to the assigned administrator to approve the RDS override.

The RDSS 108 is informed when the vehicle is in motion. The speed at which the RDS invokes the RDS restriction policies may be set by the administrator of the service. Typically this would be at a speed of 5-15 mph. A hysteresis algorithm can be utilized to prevent the system from activating and deactivating the RDS policies excessively when the vehicle is in stop-and-go traffic. Typically the hysteresis profile may be set to activate the RDS policies when the vehicle equals or exceeds 15 mph, and deactivates the RDS policies when the vehicle falls below 5 mph.

When the RDSS 108 determines that the vehicle is in motion, for example by exceeding the hysteresis speed of 15 mph, the RDSS 108 then sends a data notification message to the GS-E 130 associated with the subscriber 102. This message can be sent over the Internet as a mobile data message, or via SMS or USSD in the case that the RDSS is not capable or configured to support mobile data service. Note that the message can be sent directly to the GS-E 130, or alternatively, it can be sent to the GS-E 130 via the GS-C 116. In the latter case, the RDSS 108 can be preconfigured to send the message to the GS-C 116 in the carrier, and the GS-C 116 then identifies the corresponding GS-E 130 to which the subscriber belongs. In this case all RDSSs can be pre-programmed to always route to the carrier's GS-C 116.

On reception of the notification that the vehicle is in motion, the GS-E 130 then invokes the RDS 108 restriction policies for the RDS subscriber that had been previously determined to be located in the vehicle and for which the RDS 108 had not received an override request. The RDS restriction policies can be set to different support capabilities based on a variety of conditions. For example, in its simplest form the RDS policy for a particular subscriber can be set to prevent all mobile calls, texts or mobile data traffic to or from the mobile device 102.

Alternatively, the policies for a particular RDS subscriber 102 can be set to allow incoming calls and incoming texts, but not outgoing calls or outgoing texts while the vehicle is in motion. Another possibility may be to allow incoming texts or calls only if they are processed by the hands-free BLUETOOTH enabled mobile phone service operated by the vehicle speaker and microphone system to ensure the user's hands are free to drive and not operate the mobile device 102.

The RDS 108 can also invoke a different set of policies for RDS subscribers 102 traveling in the vehicle but which are not the driver. For example, for these passengers the RDS policy can be set to enable incoming and outgoing texts but restrict incoming and outgoing calls, so as not to disturb the driver. In another example, calls to and from an RDS subscriber 102 can include an alert or voice message to indicate the vehicle is in motion, but still allow the call to route. In addition, the RDS subscriber can be presented with a prompting for input to confirm acknowledgement and or a reason for electing to order the system to proceed with the call, after which the system records the user's selection and other call details and proceeds with routing the call.

According to another example, the system may provide the RDSS 108 is independent of the mobile phone device 102 and the mobile network 10 and carrier network 20. The RDSS 108 reports vehicle speed to the GS-E 130 anytime the predefined thresholds are reached or crossed. When a call/text/data session is attempted to or from the mobile device 102, the switching network sends a request for action to the GS-C 116, which responds by sending an inquiry to the GS-E 130. As a result, the GS-E 130 checks the last recorded speed event received from the RDSS 108 and uses that as input to determine the policy on how to route the session. The RDSS 108 itself is a system, which has a transmitter and a processor. The processor is used to assess the vehicle speed and orchestrate the transmission of the events via a transmitter to the edge gateway server. The RDSS 108 reports the vehicle events to the GS-E 130.

In the case where a user does not respond to the prompting, for example in the case where they are incapacitated, the system may proceed to route the call and either record or ignore the call details. An allowed list of callers can be setup that overrides the RDS policies, such as to always enable calls or text messages to/from an administrator such as a parent or supervisor, even while the vehicle is in motion. Emergency calls such as to 911 or other emergency services will always override the RDS policies.

Note that if the RDSS 108 and/or RDSS subscriber's mobile device 102 are located in an area where the service coverage from the mobile network is insufficient to deliver the messages, then it may not be possible for the RDSS to function. However, in such a case it will be equally impossible for the RDS subscriber 102 to utilize the mobile network to make or receive calls and/or send/receive data messages. Once the vehicle is in motion and it has been determined that the RDS subscriber 102 is in the vehicle, the RDS policies are invoked by the GS-E 130.

In the case of a call origination, whenever a RDS subscriber originates a mobile telephone call or session, the MSC 110 or CSCF (118-122) sends a notification to the GS-C 116 requesting instructions before the call can be routed. The GS-C 116 identifies to which GS-E 130 the subscriber belongs (e.g., the subscriber is an employee of Acme corporation). The GS-C 116 then forwards the information about the call request to the corresponding GS-E 130 located in the enterprise network 30 of Acme corporation. The information sent may include the originating subscriber information, the desired destination, the subscriber's present location as well as other network-based service information. Note that the GS-C 116 may not necessarily be physically located in the carrier network 20, and may instead be hosted external to the carrier's network 20 and interconnected via the Internet Protocol (IP) and/or signaling system #7 (SS7) signaling.

The GS-E 130 may not necessarily be physically located in the enterprise network 30. Instead, the GS-E 130 could be hosted external to the enterprise network 30, for example in the carrier's network 20 or in a third party hosting facility, and interconnected with the enterprise via an IP connection. In the case where the GS-E 130 is hosted by a carrier 20 or third party, it is possible for the GS-E 130 to be configured as a multi-tenant platform allowing many enterprises 30 to utilize the same GS-E 130, and where each enterprise 30 acts as a shared and securely separated tenant of the GS-E 130.

On reception of the information from the GS-C 116, the GS-E 130 then applies logic to this information in accordance with specific policies to decide whether or not to allow the call origination to continue, and if so what instructions to send back to the GS-C 116 for the GS-C 116 to instruct the MSC 110 or CSCF (118-122). If it has been determined that the RDS subscriber 102 is not located inside the vehicle 100, or if the vehicle is not activated (i.e. powered on) or the vehicle is not moving, or the vehicle is not moving over the hysteresis activation speed (e.g. >=15 mph), then the GS-E 130 may instruct the GS-C 116 to allow the call to proceed as normal.

If however the vehicle is already activated (i.e. powered on) and in motion, and it has been determined that the RDS subscriber 102 is inside the vehicle, then the GS-E 130 may elect to disallow the call origination request. Or the call may instead be routed to a pre-recorded message that may inform the driver that they cannot originate a call while the vehicle is in motion, or invoke other data communications. If the RDS subscriber 102 has dialed an emergency number, the system would allow the call to be routed irrespective of any of the above conditions. The RDS 108 may also allow only specific phone numbers to be called when the above conditions are met, for example a pre-approved list, such as to a systems administrator, manager, spouse or child. In such a case, the system may inform the RDS subscriber 102 during the call setup that a particular call is being allowed for one of the above-noted purposes despite the vehicle being in motion.

For a call termination to the subscriber, prior to routing the call the user, the MSC 110 or CSCFs (118-122) would send a notification to the GS-E 130, which would determine the appropriate routing instructions. Similar to the above case of call origination, if it has been determined that the RDS subscriber 102 is not located inside the vehicle 100, or if the vehicle is not activated (i.e. powered on) or moving, or the vehicle is not moving over the hysteresis activation speed (e.g. >=15 mph), then the GS-E 130 may instruct the GS-C 116 to allow the call to proceed as normal.

If however the vehicle is activated (i.e. powered on) and in motion, and it has been determined that the RDS subscriber 102 is inside the vehicle, then the GS-E 130 may elect to disallow the call termination request, or may instead route the call to a pre-recorded message that may inform the caller that the RDS subscriber cannot be reached at this time, or alternatively invoke other treatments. If it is an urgent matter, the remote caller may be able to override the system with a special code that would force the call to be routed to the RDS subscriber 102 irrespective of any of the above conditions.

The RDS 108 may also allow calls from only specific phone numbers to be routed when the above conditions are met, for example from a pre-approved list, such as from a systems administrator, manager, spouse or child. In such a case, the system may inform the RDS subscriber 102 with a special ring tone, a text message delivered in advance of the call alerting, or a recorded message upon the call being answered that this particular call is being allowed despite the vehicle being in motion.

In the case of text message originations and terminations, the case for controlling incoming and outgoing text messages is similar to the case of mobile originations and terminations for mobile calls. Once the vehicle is in motion and it has been determined that the RDS subscriber is in the vehicle, the RDS policies are invoked by the GS-E 130. In the case of a mobile originated text message (MO-T), whenever an RDS subscriber 102 originates a text message, the MSC 110 or CSCF (118-122) sends a notification to the GS-C 116 requesting instructions before the text can be routed. The GS-C 116 identifies which GS-E 130 provides a subscription to the subscriber, for example the subscriber may be an employee of Acme corporation. The GS-C then forwards the information about the call request to the corresponding GS-E located in the enterprise network (of Acme corporation).

The information sent may include the originating subscriber information, the desired destination, the subscriber's location as well as other network-based service information. Upon reception of the information from the GS-C 116, the GS-E 130 then applies logic to this information in accordance with specific policies to decide whether or not to allow the text message to continue onward, and if so, what instructions to send back to the GS-C 116 for the GS-C 116 to instruct the MSC 110 or CSCFs 118-122 and/or the short message service center (SMSC), which may be part of the MSC 110.

If the RDS subscriber 102 is not located inside the vehicle 100, or if the vehicle 100 is not activated (i.e. powered on) or the vehicle is not moving, or the vehicle is not moving over the hysteresis activation speed (e.g. >=15 mph), then the GS-E 130 may instruct the GS-C 116 to allow the text message to proceed as normal. If however the vehicle 100 is activated (i.e. powered on) and is in motion, and the RDS subscriber 102 is inside the vehicle 100, then the GS-E 130 may elect to disallow the text message from being delivered, and may instead deliver a text message to the RDS subscriber 102 with an indication that the text message failed and the reason (e.g. "vehicle is in motion"). Or instead, the GS-E 130 may invoke other treatments.

The RDS 108 may also allow text messages to be sent only to specific phone numbers when the above conditions are met, for example a pre-approved list, such as to a systems administrator, manager, spouse or child. In such a case, the system may inform the RDS subscriber 102 with a text message response and/or confirmation that because this particular text message is allowed to be delivered despite the vehicle being in motion. The system may elect to defer delivery of the confirmation message until such time as the restrictions have been lifted, for example when the vehicle comes to a stop.

For a mobile terminated text message (MT-T) to the subscriber, prior to routing the text message to the user, the MSC 110 or CSCFs 118-122 would send a notification to the GS-E 130 that would determine the appropriate routing instructions. Similar to the above case of MO-T, if it has been determined that the RDS subscriber is not located inside the vehicle, or if the vehicle is not activated (i.e. powered on) or the vehicle is not moving, or the vehicle is not moving over the hysteresis activation speed (e.g. >=15 mph), then the GS-E 130 may instruct the GS-C 116 to allow the text message to proceed as normal.

In the case where the vehicle is activated (i.e. powered on) and in motion and it has been determined that the RDS subscriber 102 is inside, then the GS-E 130 may elect to disallow the text message from being delivered, and may instead deliver a text message to the originator with indication the text message failed and the reason (e.g. subscriber is unavailable at this time), or may invoke other treatments. The system may alternatively elect to defer delivery of the message in a queue, such as in the MSC 110, until such time as the restrictions have been lifted, for example when the vehicle comes to a stop. The RDS 108 may also allow text messages to be received only from specific phone numbers when the restrictions are in place, for example a pre-approved list, such as from a systems administrator, manager, spouse or child.

According to one example embodiment of the present invention, a method of regulating mobile device usage may include determining a speed event indicating that a speed of the motor vehicle has performed at least one of exceeded a first threshold above which mobile device usage restriction policies are invoked and fallen below the first threshold allowing the mobile device restriction policies to be removed at operation 402. The speed event may be a particular instance of motor vehicle speed measure by a GPS measurement, local radar or a mobile device application that uses GPS or the carrier network. The method may also provide transmitting the speed event to a remote edge gateway server located remotely from the motor vehicle, at operation 404 and storing the speed event in the remote edge gateway server, at operation 406.

Subsequently, at least one mobile device in the vehicle may perform originating at least one of an attempted voice call, text message and mobile data communication session. As a result, the method may further provide querying a carrier gateway server to determine how to route the mobile data communication session. A message may be sent informing the remote edge gateway server of the mobile data communication session attempt and the stored speed event may be verified to determine whether to invoke mobile device usage restriction policies. The method may also include sending routing instructions to the carrier gateway server indicating how to route the mobile data communication session, and routing the mobile data communication session responsive to receiving the routing instructions. A location of the mobile device(s) may be determined to be in close proximity to the motor vehicle based on a distance between the at least one mobile device and the motor vehicle.

Regarding mobile data restrictions, once the vehicle is in motion and it has been determined that the RDS subscriber 102 is in the vehicle 100, the RDS policies are invoked by the GS-E 130. In the case of a mobile data request whenever an RDS subscriber originates a mobile data request (e.g. http request), the SGSN sends a notification to the GS-C 116 requesting instructions before the text can be routed. The combination of the GS-C 116 and GS-E 130 may act as a GGSN, so that the GS-C 116 appears to be a standard GGSN to the mobile network, which is securely interconnected via a secure tunnel to the GS-E 130 typically located in an enterprise 30.

The secure connection between the GS-C 116 and GS-E 130 can simply be an extension of the existing protocol between the SGSN and GGSN (e.g. gateway tunneling protocol (GTP) tunnel), or alternatively, can be a different security protocol specifically selected between the GS-C 116 and GS-E 130 in accordance with the requirements of a particular enterprise (e.g. a proprietary high encryption protocol can be utilized between the GS-C 116 and GS-E 130 for access to a military site).

The GS-C 116 identifies which GS-E 130 the subscriber belongs is subscribed with, for example the subscriber may be an employee of Acme corporation. The GS-C 116 then forwards the information about the mobile data request to the corresponding GS-E 130 located in the enterprise network 30 of Acme corporation. The information sent may include the originating subscriber information and address, the desired destination address, the subscriber's location as well as other network-based service information. Alternatively, the GS-C 116 may elect to send the entire mobile data request to the GS-E 130.

On reception of the information from the GS-C 116, the GS-E 130 then applies logic to this information in accordance with specific policies to decide whether or not to allow the mobile data request to continue. If allowed, the GS-E 130 can route the mobile data request to its intended destination. The return address can either be set to the GS-E 130, which may maintain a session state in order to remember to allow the response to be delivered back to the device 102, assuming it was allowed to be delivered. Alternatively, the return address can be left unaltered such that the response will be delivered directly back to the RDS mobile 102, and would then be subject to policy on the response leg. In this latter case, the GS-E 130 does not need to maintain state information about the session.

If it is determined that the mobile data request is not allowed due to the vehicle being in motion with the RDS subscriber inside, then the RDS 108 may or may not inform the RDS subscriber 102, either via a mobile data response or a text message with reason (e.g. request denied, vehicle in motion). In the case of a request delivered to the RDS mobile 102, the above description remains the same, and the incoming request is subject to policies of the GS-E 130 before being delivered to the RDS mobile 102.

In both cases, it is possible to override the policy restrictions for mobile data requests to and from a specific list, such as system administrators, managers, spouse, children and/or specific devices. The override exceptions could be identified by their associated IP addresses, port numbers or other methods of identification in accordance with Internet addressing techniques. Their address information may be stored in an exception list that is referenced each time a call or message is originated or received from the mobile device 102.

With regard to certain restriction areas, such as femtocells or femtozones, it is possible to impose policy restrictions on mobile device usage based on a specific location for any mobile device with the use of miniature mobile base stations such as femtocells. Femtocells are small cellular base stations, that are typically designed for use in a home or business, and which connect to the mobile carrier's network using a broadband connection typically over the Internet. These devices are typically used to allow service providers to extend service coverage indoors, where access may otherwise be limited or unavailable. The solution works with any mobile phone from a particular mobile service provider.

Extending this concept enables a femtocell or group of femtocells to be used not only for indoor use, but also outdoors, such as in a designated school zone, where using a mobile telephone may be prohibited while driving. This type of zone can be considered a femtozone. As a vehicle approaches the school zone where restriction policies are mandated, signage would indicate that the user is approaching a school zone where usage of mobile devices is not permitted while driving.

Figure 3:
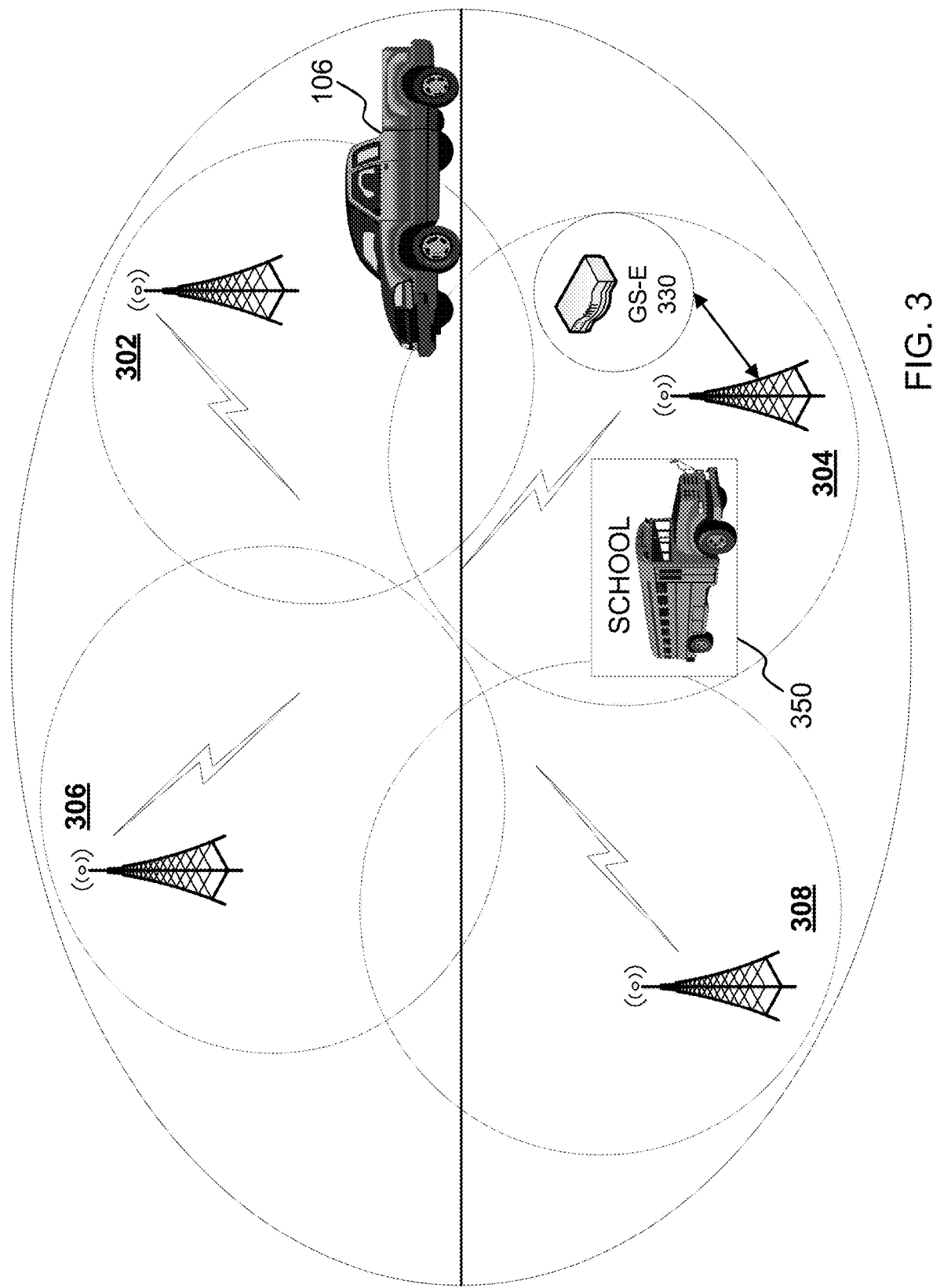
FIG. 3 illustrates an example femtozone network configuration, according to example embodiments of the present invention.

FIG. 3 illustrates a mobile deice 102 traversing through various femtocell zone locations, according to example embodiments of the present invention. As any mobile device 102 inside the vehicle approaches the femtocell zones, or femtozone, the mobile device will attempt to connect to the femtocell base station. The femtozones illustrated in FIG. 3 may be placed alongside a road that the vehicle 100 is traveling. In this example, various femtozones are operated by base stations 302, 304, 306 and 308.

Note that a femtocell is required for each mobile service provider in a school zone, or alternatively a single femtocell can be shared by multiple mobile service providers. Note that it is possible that when a femtocell detects a mobile device approaching, but where the signal strength remains insufficient for the mobile to connect to the femtocell, it is possible for the femtocell to nevertheless inform the GS-C 116/GS-E 130, which could, in turn, send a timely text message to the mobile device to inform the subscriber that they are approaching a school zone where restrictions are in force and will be imposed. It is possible for the GS-E 130 to be located in a SCN that is managed and controlled by the school itself, a local government or municipality, a mobile service provider, and/or by a third party company offering such services.

For mobile devices that are not already engaged in an active call, the devices will register on the femtocell. The registration will be recorded in the HLR 112 and a VLR include din the MSC 110, and/or the HSS 114 and CSCFs 118-122, and/or the SGSN/GGSN of the GS-C 116 and GS-E 130. If a mobile device 102 that is registered on the femtocell attempts to make or receive a call, text and/or mobile data request, irrespective of whether or not the subscriber is designated as a RDS subscriber, the service provider's GS-C 116 will be informed of the call, text or data session in advance of it being routed.

In this case, the GS-C 116 can recognize that the subscriber 102 is located on a femtocell that is in a school zone, and therefore routes the information to a specific GS-E 330 that handles school zone restrictions for all subscribers of this mobile service provider. The GS-E 330 then can restrict the call, text and/or mobile data session, or apply specific policies as described earlier, such as to route an incoming call to voicemail.

The femtozone enabled GS-E 330 can enable restriction policies that take into account time of day (ToD), day of the week (DoW) and other criteria such as holidays to determine whether or not to invoke certain restriction policies. For example, the femtozone GS-E 330 may imposed full restrictions on calls, texts and mobile data during school zone times where vehicles are required to slow down to 20 mph, such as during morning drop-off and afternoon pickup times. Outside of these times, but still during the school day, the GS-E 330 could be set to restrict origination of outgoing calls and text messages but still allow incoming calls and text messages to be received at the mobile device 102 inside the vehicle 100. Outside of the school day as well as weekends and holidays, the system can be set to impose no restrictions.

If the subscriber 102 was traveling through the school zone is also a RDS subscriber, the GS-C 116 would assign the school zone GS-E 330 as the primary GS-E for imposing restrictions, and could subsequently defer to the enterprise GS-E 130 as a secondary GS-E, should additional restrictions be required. For example, if an RDS subscriber 102 were traveling through a schoolzone on the weekend, then the school GS-E 330 would impose no restrictions, however the enterprise GS-E 130 could still impose restrictions to prevent calls and text messages while the vehicle is in motion.

In the case of a call-in-progress, when any mobile subscriber 102 approaches the school zone femtocell, the call would be handed off to the femtocell as expected. In this example, certain policies could be instituted in which the call could be ended by the network, or other call handling procedures, such as pausing the conversation by placing the parties on hold and potentially playing a recorded message to indicate to one or both parties that the mobile user is in the school zone and will be placed on hold until they leave the school zone. The message played to the other party may be a message indicating the user is temporarily unavailable but will be reconnected shortly.

When the mobile subscriber exits the school zone and performs a handoff from the femtocell back to the macro-cellular network of FIG. 1, the call can be reconnected automatically. Note that it is possible that a mobile subscriber that is not in a vehicle enters the femtozone will also have restrictions imposed. For example, although the mobile user may not be an RDS subscriber, the vehicle's RDSS system may still be used to restrictions on the user of the vehicle.

In order to enable mobile subscribers to exit a restricted mode, an override code can be used. For example, the system may send a user a text message as they approach a femtocell or when they have already registered on the femtocell, and therefore have been restricted. The text message may include an override code that the user can invoke. This code can be made sufficiently lengthy so as to significantly discourage users in a vehicle from attempting to enter the override code during the period in which they're located in the femtozone.

Another example may include calculating the vehicle's location at multiple points to determine velocity, and if the user exceeds a certain speed for walking such as 5 mph, then it can be assumed the mobile subscriber is in a vehicle. This example can make use of network-based GPS calculations via the MLC and GS-C 116 and GS-E 130, or alternatively using an open and accessible GPS device on the mobile device itself, or a combination of network and device-based GPS implementations.

In another example, by setting up a series of femtocells within the school zone, instead of a single femtocell, it is possible to enable the femtocells to be utilized to ascertain the location rather than burdening the more expensive macro cellular network. Referring to FIG. 3, a school zone can be setup with multiple femtocells, such as three or more (e.g., 302, 304, 306 and 308). The first zone 304 may be one end of the school zone, the second zone 302 may be within the schoolzone area of the school 350 but away from the street, and the third and fourth, 306 and 308, respectively, may be located at opposite ends of the femtozone.

In this school zone example, three of the four femtocell base stations may form a triangle that can be used to determine location information within the primary femto-zone 302 via triangulation of the mobile device power signal or via any comparable position determining algorithm. These location calculations can be handled by a dedicated MLC either in the service provider's network, a network dedicated to a group of schools and/or school zones, or to a single school zone. In this case, it is possible for a dedicated MLC to be connected directly to a femtocell controller included in the GS-E 330, exclusively for calculating velocity. In this manner, the service provider's main MLC typically used for 911 emergency calls on the macro cellular network will not be overloaded, nor will the macro network cellular radios be overloaded with mobile location requests.

In another method, any mobile device that enters the school zone can attach to the femtocell, and once connected with the femtocell, the mobile device will automatically be subject to restriction policies in accordance with the rules (e.g. during the school zone restriction period when the lights are flashing, restrict all incoming/outgoing calls, outgoing texts and mobile data requests, etc.). This implies that all mobile devices may be subject to the policies, conditions and restrictions of the school zone, irrespective of whether the mobile user is walking, or driving in a vehicle.

When the user makes or receives calls or text messages or originates mobile data, the network will request their permission to proceed and by doing so the user is acknowledging that they are in compliance with the local regulations (i.e. that they are not the driver of a motor vehicle at the time of the event). The mobile user's acknowledgement is recorded in the system as an event, and can be later retrieved should the user have been found to be driving in violation of the rules.

According to one example method of operation, a mobile user may enter the school zone and connect to the femtocell, the user may attempt to originate a call. Before the call is routed to its intended destination, a recorded message can be played to the originating party stating for example, "you are in a school zone where it is prohibited to use your mobile phone while driving. Press 1 or say "proceed" to acknowledge that you are not driving or press 2 for help". The user may then press 1 or say "proceed", or press 2 or say "help" for more information. The system records the user's selection in its database, and allows the call to proceed. Otherwise, the call may be terminated.

A user that is a passenger in the vehicle (not the driver), or who is a pedestrian in the school zone, can enable calls to be routed without restriction. Note that the system can also record that the user hung up the call or simply did not proceed with the call. This information can be used as a confirmation that the user heard the message and realized they were in the school zone, and elected to comply with the regulation by not proceeding with the call. If the user selects 2 or says "help", the system can inform the user of additional information, such as the regulations, the times when the regulations are in force, as well as override capabilities described in detail below.

In the event of calls terminated to a mobile user in the femtocell after the mobile phone rings, the subscriber can answer the call and be played a similar message. The user can then hang up or press 1 or say "proceed" to acknowledge that they are not driving in order to proceed with accepting the call. In the case of the user originating a text message, after the user has sent the text message, the system can respond with a text message stating "you are in a school zone where it is prohibited to use your mobile phone while driving, reply to this message with ["p"] to proceed and acknowledge that you are not driving". Note the text within the brackets can be optional. If the user responds to the text message with ["p"] if the message so stated, the system records the user's choice in the database, and then allows the text message to be delivered.

The system may not prevent the user from composing and sending the text message in the first place. However, the notifications will make the user aware of the regulation for subsequent messages and prevent the message from being delivered without their confirmation of acknowledgement. The user's action on whether or not to proceed will be recorded in the system and can be later retrieved. The user may be required to undergo additional operations and steps to send or receive a text message while traveling through a regulated area or zone. This add-on feature of the local system may be a deterrent or avoidance procedure in of itself without requiring the ability to block or stop a user's cellular service.

If the user elects not to proceed by responding with any other information than what was specified or by not responding at all, the text message can either be discarded and the user will have to re-send the message when they are out of the school zone, or alternatively the system can automatically send the message when the user's mobile registers that it has left the school zone (by exiting the femtocell and connecting to the macro cell). Alternatively, the system can inform the user with a text message when the user has exited the school zone that they have a text message pending for delivery and request the user if the message should be sent, to which the user can respond by replying to this notification text message whether to deliver or discard the message. The user's decision can also be recorded by the system by indicating that the user waited until exiting the school zone to deliver the message.

Incoming text messages can be held in a store-and-forward queue until the subscriber exists the femtozone. However, if the user is a pedestrian or someone who is not the driver then they will not have knowledge that text messages are waiting for them. In this case a text message can be sent to the user stating "you have a text message waiting but you are in a school zone where it is prohibited to use your mobile phone while driving, reply to this message with ["p"] to proceed and to acknowledge that you are not driving." If the user responds with "p", the system records the user's choice in the database, and then allows the text message to be delivered. The user's action on whether or not to proceed will be recorded in the system and can be later retrieved.

If the user elects not to proceed by responding with any other information other than what was specified, or by not responding at all, the text message can either be discarded, or alternatively, the system can automatically send it when the user's mobile device confirms that it has left the school zone. The mobile device may confirm that it is ready to accept communications by exiting the femtocell and connecting to the macro cell, or the system can inform the user with a text message when they have exited the school zone that they have a text message pending. The system may send a request to the user to determine if the message should be delivered. In response, the user can respond to the notification text message whether to deliver or discard the message. This information can also be recorded by the system (e.g. that the user waited until exiting the school zone for delivery of the message).

Note that in some cases, calls or texts to or from emergency numbers such as 911 will always override these policies. For pedestrians or drivers that are regularly in the school zone during the restriction periods, the system can enable them to use override codes to be able to record their acknowledgements that they are not driving without having to go through the steps of responding to a confirmation message. These override capabilities can also be enabled for RDS subscribers, so that they are able to override the system in an emergency, if they are not the driver of the vehicle, or for other reasons while ensuring that their decision to override is recorded by the system.

For example, a user originating a mobile phone call or text message can enter a prefix code such as *11 before the digits to be dialed, or append a postfix code such as #11 to the digits to be dialed. By including such a code, the system may consider that the user is not the driver and therefore should proceed with the call or text message. The system would strip the prefix or postfix, record the user's acknowledgement in the database and then proceed with the call or text message. The system can be set to require the prefix or postfix code for each and every call or text message, or can be set to require the code only for the first communication attempt, until such time as the user has exited the school zone, or the restriction period has ended.

Different override codes can be used for different reasons with different policies. For example, *99 or #99 can be used by the subscriber to indicate that the override request was to address an emergency situation. In another example, *22 or #22 could be used to indicate that the override request was to indicate that the user is in a school zone but are not in a vehicle.

In another case, it is possible to override the system automatically if the system determines the mobile device is specifically exempt from the policies. For example, if the subscriber is also an RDS subscriber and the system has been able to determine that they are in their vehicle within the school zone and that the vehicle is stopped or traveling below the threshold above which the restrictions normally apply, then the system can automatically enable calls and/or texts or mobile data to be utilized by the user without having to go through the steps of responding to a confirmation message.

Regulating the mobile device communications in certain geographical areas may be performed with modifications to the device itself. Also, no software is required to be deployed onto the mobile device 102. Also, there is no requirement that a mobile device support a GPS service, BLUETOOTH, WiFi, etc. Such a system may enable the aggregation of both the vehicle and calling data in the network to be reviewed, verified and serve as input to driver scoring algorithms, insurance ratings or other statistical analyses. Other features may enable the carrier to be an integral part of the value proposition so the carrier's network information is utilized to enable the system.

Figure 4:
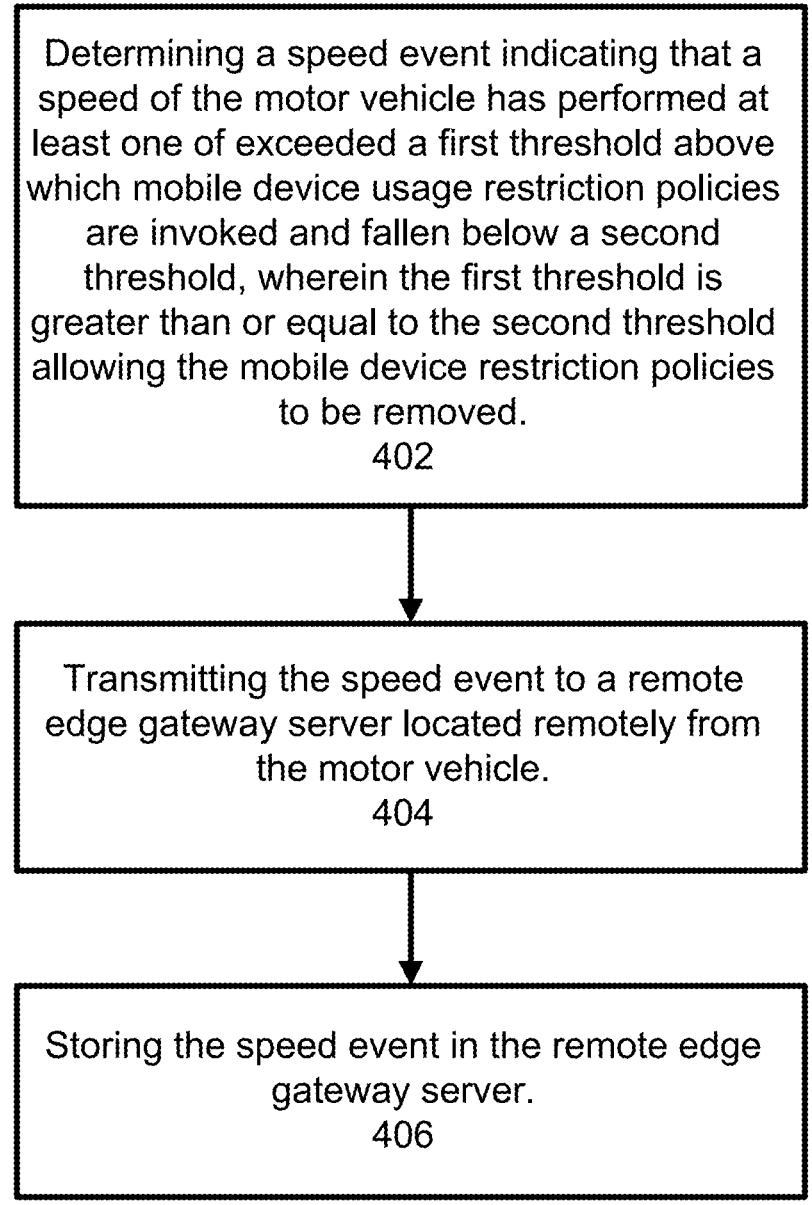
FIG. 4 illustrates a flow diagram of an example method according to an example embodiment of the present invention.

FIG. 4 illustrates an example method of regulating mobile device communications while operating a motor vehicle. Referring to FIG. 4, the method may include transmitting a connection request message to a first base station to a session switching network via the mobile device traveling in a moving motor vehicle, at operation 402. The method may also include transmitting a notification message identifying the mobile device to a gateway server from the session switching network, at operation 404, and receiving a treatment response from the gateway server, the treatment response ordering a treatment different from a normal treatment to reflect restrictions on the use of the mobile device within a communication area of the base station, at operation 406.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent any of the above-described network components 102-134, etc.

Figure 5:
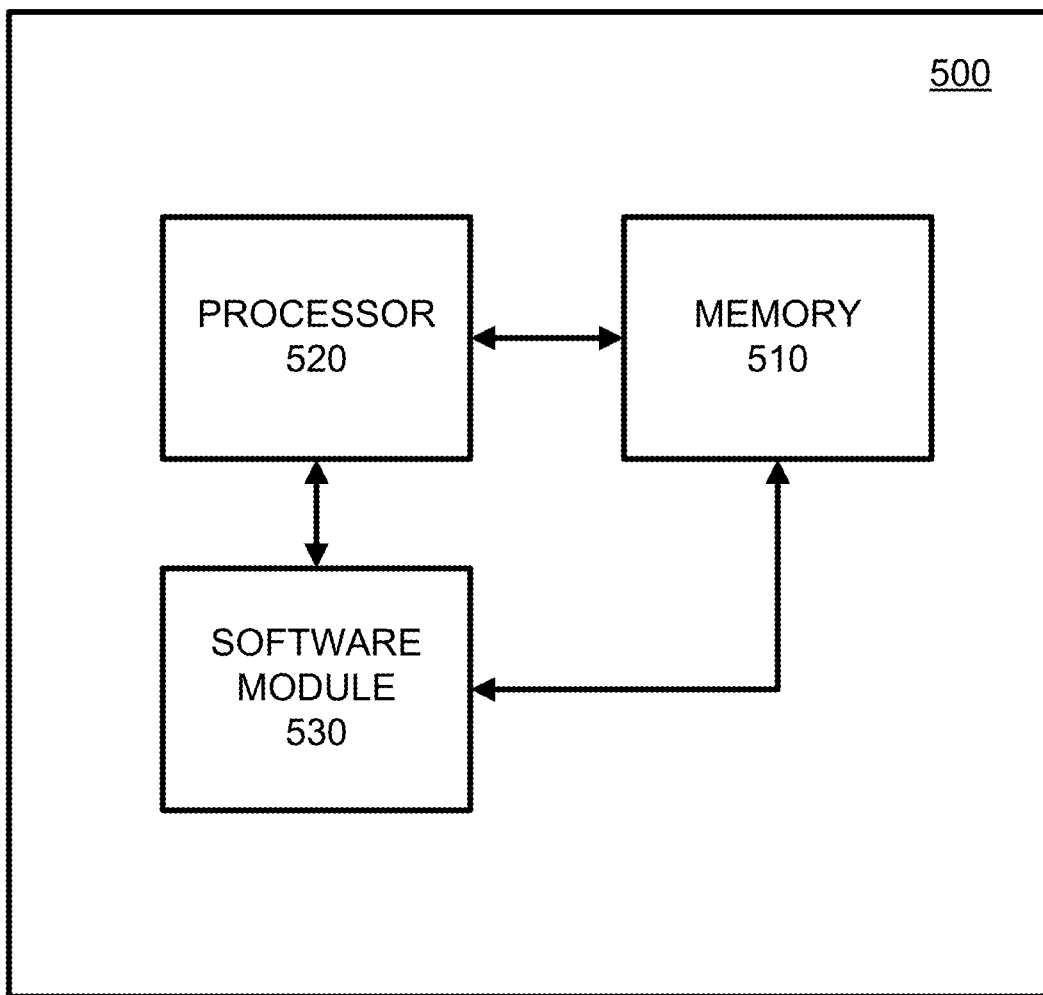
FIG. 5 illustrates an example network entity device configured to store instructions, software, and corresponding hardware for executing the same, according to example embodiments of the present invention.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Vehicle-to-everything (V2X) communication is the sharing of information between a vehicle to any communication enabled entity that may impact the vehicle. V2X may include vehicular communication systems that may incorporate specific communications including but not limited to V2V (Vehicle-to-vehicle), V2I (Vehicle-to-Infrastructure), V2P (Vehicle-to-Pedestrian), V2D (Vehicle-to-device) and V2G (Vehicle-to-grid). All such examples include, fundamentally, one or more vehicle communication devices and one or more external communication devices attempting to receive and/or transmit data to the vehicle communication device.

The V2X system environment may promote efficiency and personal safety to passengers, drivers, pedestrians and other user environments. In a more specific context, V2V communication may include the sharing of data between vehicles, via vehicle communication devices located on and/or around the vehicles, transmitted wirelessly for the purpose of enabling vehicles to share information, such as position, speed, vehicle attributes, current operating conditions, third party safety concerns, etc. over an ad-hoc network. This information can then be utilized to provide drivers with informative and even 'warning' information and/or enable the vehicle control systems to take pre-emptive actions to change directions to optimize efficiency, reduce travel time, reduce risk and/or avoid collisions.

V2V communications provide information necessary for a vehicle to augment its own onboard vehicular control systems for various function, including but not limited to lane departure/change, adaptive cruise control, blind spot detection, parking sonar guidance, construction site slowdowns, traffic pattern adaptation, and backup cameras with live and real-time information and surrounding awareness in order to be able to make intelligent decisions regarding the vehicle control and operation. V2V generally uses short range communications to share information from one vehicle to other vehicles and/or with nearby or road adjacent vehicle detection communication platforms designed to communicate directly with the vehicle communication modules.

V2V communications systems may use dedicated short-range radio communication (DSRC) to send messages that contain information about a vehicle in motion, and also to receive information from other vehicles, which may be traveling on the same road, in a different direction and/or alongside other vehicles within range of the short-range radio communication. This information that is shared can include, but is not limited to vehicle speed, direction of travel, braking information, etc. DSRC is a radio frequency (RF) technology that is intended to be secure, short range, quick and able to pass through and around barriers and is not just a line-of-sight type of communication. The messages that vehicles exchange may be a basic safety message (BSM), which can be sent multiple times per second, typically ten times a second. Receiving vehicles of BSMs can utilize the information to assess collision threats depending on rules, procedures and other information stored in the vehicle computer processing platform. With this shared information, safety features can be invoked to provide drivers with warnings, such as when it is not safe to enter an intersection or to make a turn maneuver, or to be alerted about upcoming stopped traffic, etc. This information can also be utilized as inputs to autonomous and semi-autonomous driving and navigation systems to enable and assess optimal routes in a safe manner. For example, this shared information can be provided as input to a blind sport warning, lane change warning, forward collision warning and automatic braking systems. In the case of active systems, such as automatic braking, BSM input can be utilized to invoke automatic braking to avoid a collision.

Similarly, the BSM information (also referred to interchangeably as V2V information) can be utilized to manage policies for occupants of the vehicle such as the driver, front passenger and other passengers that may be seated in rear seats. Different policies can be applied to different types of occupants based on demographics, seating location in the vehicle and designated function information (e.g., driver, front passenger, rear passenger, etc.). This can include policies to limit or control distracting information to a driver that can be presented on a mobile device, on an in-vehicle 'infotainment' screen (front driver-accessible or driver-visible), or for rear passengers (non-driver accessible or driver-visible or other designations) or also a heads-up display (HUD), which may provide information projected onto the driver windshield.

In one example, an inexperienced teen driver may have more restrictive policies imposed when compared with a 5-year accident-free driver. For example, a teen driver or an elderly driver operating a vehicle may have restrictions that prevent all communications services including calls, messaging, such as texting, MMS and data usage except for emergency services, such as for calling, messaging and data which may still be permitted from the time the vehicle is turned on until the time is vehicle is turned off, even when the vehicle is at rest and while the vehicle is turned on and operable. These restrictions can be extended to in-vehicles systems such as the head unit, display screens, control systems and even the Head-Up Displays (HUD), where restrictions may be placed on what information is displayed for the driver such as speed, limited navigation information and safety systems information, such as blind spot warnings or lane keep assist alerts, while restricting other information, such as 'infotainment' or Internet services alerts. Conversely, a 5-year accident-free driver may be permitted to receive incoming calls and selected incoming messages with the ability to submit canned responses (i.e. a limited set of easily invoked responses that can be selected with minimal cognitive and physical input) when the vehicle is in motion as long as there is minimal V2V traffic detected or when they are stopped at a traffic signal, where the V2I information indicates there is sufficient time available until the traffic signal changes.

V2I is a communication system which enables vehicles to share information with infrastructure components that support traffic and roadway systems. A few examples of such services may include, but are not limited to, traffic lights, lane markers, street lighting, RFID systems, traffic and speed cameras, road signage, parking meters, etc. V2I communication is bi-directional and can be both short and long range. Short range systems can use mesh network technologies enabling a vehicle to communicate with, for example, a stationary traffic light as the vehicle approaches the traffic light location. Long range systems may use mesh networks or mobile networks such as those operated by cellular network providers, which can interface with the Internet and private networks including intelligent transportation systems. These systems can share intelligent traffic information with a vehicle, such as traffic light sequencing information which can be used, for example, to identify and share with the driver or vehicle systems associated with the driver when a traffic light will turn green, provide a suggested speed to the driver or related vehicle systems in order to minimize red lights experienced by the vehicle movement on a projected route.

The sharing of V2I information with any particular vehicle can assist with traffic light sequencing. This information can be shared with the vehicle to alert the driver as to when the traffic light is expected to change from red to green as the driver is waiting at a red light, or, when a driver is in motion and approaching a green light, a point in time and/or location when the driver can be alerted as to how much time remains until the light will change to yellow and/or red. All such information can optimize driving experiences, and may provide opportunities for drivers to engage in mobile device usage at safe times and locations even when operating the vehicle.

Similarly, this shared vehicle network information can be used by autonomous and semi-autonomous vehicles, for example, to decide when a vehicle should begin moving and accelerating and/or decide when to re-activate an internal combustion engine in a vehicle equipped with an engine start/stop feature such that the engine will automatically re-start just before the light turns to green so that the vehicle is ready to accelerate at the right moment while preserving fuel economy.

In one example embodiment, a vehicle equipped with V2I services can also be used to optimize distracted and unsafe driving with any participating vehicle. Drivers of a vehicle may be prohibited from viewing and/or interacting with a vehicle device, such as an onboard 'infotainment' screen in the vehicle that could be used for controlling audio and visual entertainment, such as a radio or navigation or a control system for climate, and other vehicle features, and/or a user device, such as a mobile phone (i.e., smartphone, cellular phone, or any computing device) when a vehicle is in motion, or even instances of non-motion when the vehicle is in traffic and/or on a roadway. The vehicle or user device may or may not be connected to the vehicle either physically, such as in a mount and/or using a physical wire connection and/or electronically via a wired or wireless connection. The vehicle device may be a software module included in the user's mobile device or a software module embedded in the computer hardware of the vehicle that operates the infotainment (entertainment, navigation, Internet applications, etc.), communications systems, including telematics control units (TCU) for enabling Internet access and/or mobile or cellular voice communications, and emergency and safety services or in-vehicle systems communications over a Controller Area Network (CAN bus) or control systems such as for climate. Various different technologies may be used to selectively or completely block access to such a vehicle device or user device by a driver when the vehicle is in motion. However, the restrictions imposed on any such vehicle or user devices should be accurately and precisely used to identify when to restrict access to a potentially distracting vehicle or user device, such that a user may be permitted to access the vehicle or user device immediately when they are allowed, and immediately restricted when they are prohibited from such usage.

According to other example embodiments, Vehicle to Pedestrian (V2P) information may include multiple types of road users including, but not limited to, walkers, bicyclists, wheelchair pedestrians and/or other users of mobility devices including children in strollers, persons with handicaps including blindness, deafness and mobility impairments, passengers entering or exiting a stopped vehicle, such as a train or bus, etc. V2P information may be shared between devices on the actual transports themselves, such as from a mobile phone in possession of a walker or bicyclist, or via a dedicated device onboard a transport such as a bus, train, bicycle, wheelchair, and stroller. These devices can communicate with vehicle systems to provide in-vehicle information, such as upcoming and intended direction of bicyclists or persons with blindness or other handicaps, active or inactive school zones or other crosswalks, warnings such as blind-spot or forward collision warnings and can also activate autonomous vehicle systems to invoke collision-avoidance systems, such as alert notifications, automatic steering and/or automatic braking.

Similarly pedestrian devices can receive vehicular information to alert pedestrians of approaching traffic, intended direction and traffic type, such as motorcycle, passenger car, commercial transport, large truck, oversized vehicle and/or potential collisions, such as via the pedestrian's mobile device or a system onboard a pedestrian transport and can be integrated with autonomous systems to actively reduce collisions, such as activating visual and/or sound alerts, closing doors or pulling in a ramp on a bus or train, and/or actively changing a course of a pedestrian transport such as a stroller, bicycle or wheel chair.

V2V, V2I and/or V2P information can be utilized as input to one or more devices to impose such user device restriction policies. In one example, a vehicle may have just come to rest at a traffic light and is not moving. The mobile device may be able to detect that the device has come to rest, using position detection via GPS, WiFi, Doppler effect frequency detection, access to the vehicle's recent speed information or other methods, and by nature of the user device and/or vehicle device being in the vehicle, that information can be used to report that the vehicle has come to rest as a condition precedent to permitting or not permitting user access to one or more features. Similarly, using vehicular information, such as from an OBDII device or an on-board telematics system, it can be determined that the vehicle is not moving. The information that the vehicle is not moving can be shared with an application residing in a network cloud, in a private cloud, such as within the control of an enterprise system, in the vehicle, or on the vehicle device and/or mobile device.

That information can be used as input to a policy decision logic to determine as to whether or not to permit access to the mobile device. The V2V, V2I and/or V2P information can then be referenced as part of the policy decision. In doing so, V2I information can be used, for example, when it can be determined that the vehicle has come to rest close to a traffic light and that traffic light is red. Also, additional decision factors to permit usage may be based on known information regarding whether that stoppage is likely to occur for a long enough period of time to warrant usage of the user device.

The V2I information sharing system can share the traffic light sequencing information, such that it can be determined, or provided by the traffic system, the amount of time remaining until the light will change to green. Based on this information, the policy function can assess whether there is a sufficient time to enable the driver to be given access to the device, potentially prioritizing specific information for the driver to view, such as a message deemed important and/or from a specific entity that came in while the driver was previously in motion. For example, if there is not a sufficiently large window of time present at a particular traffic light stop, then perhaps only messages deemed important may be released to the user interface, such as an e-mail or SMS message which was previously queued and held by a management application. In the event that there is a limited time window (e.g., 1 minute, 30 seconds, etc.), then only certain information may be shared, such as a message identified as having important information, while other such messages previously queued which do not have an important designation, are still withheld until a later time when the vehicle is known to be in a safer location and/or for a longer time window stopping point. The system application can also share with the driver device the amount of time remaining until the traffic light will change to green, and provide a different amount of time until the device will be locked again, for example, the policy can be set to lock the device five or ten seconds before the light turns green in order for the driver to be able to prepare for the task of taking over control of the vehicle in motion and not being distracted at that moment in time.

If the amount of time from when the vehicle came to rest and when the light will change to green is a short time window, the policy system may, for example, select not to grant access to the driver to use the device, or alternatively, may instead only display selected information for the driver to view in the remaining time, such as a number of messages that are queued for delivery (e.g., voice, text, e-mail, social media, etc.), from which locations (entity, application, etc.) and if any were marked urgent. With that information, the driver may elect to change their plans and instead of continuing their journey, may instead choose to pull over in a safe area where they will be granted full access to the device so that they can review and respond to the messages once the vehicle has been parked for a certain period of time and/or is identified as not being on the established roadway and in traffic with other vehicles or other criteria for determining the driver is safe to be granted access.

V2V information can also be utilized as input to policy decisions for enabling access to distracting devices. The detection of significant V2V information by the driver's vehicle device and/or mobile device may indicate there is significant traffic in the immediate area, and this situation may warrant more attention and focus by the driver on the task of operating the vehicle in which case the user's mobile device may again be disabled or restricted from usage. The tiers of restrictions may include but are not limited to no (SMS) text messaging, no Internet or cellular data usage, no phone call usage (incoming and/or outgoing), and no display usage (i.e., nothing is accessible) absent a few exceptions, such as streaming music applications providing BLUETOOTH audio to the vehicle infotainment system.

The detected V2V information can be shared with other computing systems that can analyze this information, such as via an algorithm or procedure to provide as input to a policy configuration, which can be used to apply policies to the user device for restricting access to all or select features and functions. Typically, a policy would activate more stringent restrictions when a threshold of a high amount of V2V information confirmed traffic has been detected and possibly moving in a particular direction, such as towards or away from or perpendicular to the vehicle and or where V2V information from other vehicles indicates they are within a close proximity possibly including the other vehicles direction of travel. The number of vehicles present to a particular vehicle and their direction of travel relative to a particular vehicle is directly proportional to an amount of danger, risk or other limiting factors required to be identified to increase safety on that particular roadway. Any of these factors may increase or decrease the relative safety risk level, which in turn, would increase or decrease the level of restrictions on user device usage while driving.

In another example, different restriction policies may be invoked if the location information of another vehicle is determined to be close to the target vehicle in which the driver is located (e.g. within a specific distance). In this example, the directional information of the other vehicle indicates it is headed towards the target vehicle versus driving away from the target, or the other vehicle is driving parallel to the direction of the target in the same direction or in the opposite direction.

In the case where there are many vehicles detected traveling in the same direction, elevated risk can be assessed by the policy engine and appropriate restrictions can be dynamically invoked such as restricting not only outgoing calls and messages but also restricting incoming calls and messages until such time as the detected traffic is reduced for a duration of time, such as for at least two minutes, at which time incoming calls and select incoming messages may be permitted to be accessed again.

In the case where there are many vehicles detected traveling in the opposite direction, a different level of risk can be assessed by the policy engine. For example, if the target vehicle is traveling in a location at the time of the detection of the high level of traffic traveling towards the target vehicle and it is known that at this location on the road there is a physical concrete separation barrier between the two sides of the road, then perhaps a lower level of risk may be assessed since the target vehicle is protected from that oncoming traffic by the known physical barrier. However, if this is a highway or road with no barrier in between, then a higher level of risk may be assessed since the target vehicle is not protected from that oncoming traffic and therefore the driver must be fully alert to the oncoming traffic.

In the case where a vehicle is approaching an intersection and may not stop at a red light where a target vehicle is waiting to enter the intersection when the traffic signal turns green, the approaching vehicle's V2V BSM information can be utilized by the target vehicle not only to dynamically apply restriction policies to any distracting devices, such as the driver's mobile device(s) as well as in-vehicle head units and infotainment systems, but also to provide warnings to the driver's accessible devices or to the autonomous driving system to 'wait' before entering the intersection, even after the traffic signal has turned to green for the target vehicle, until such point as the approaching vehicle has passed, thereby potentially avoiding a collision. In such a case, the V2V BSM information sent from the vehicle approaching the intersection perpendicular to the target vehicle can be combined with the V2I information from the traffic network to better determine if the approaching vehicle is capable or intends to stop in time to avoid unsafe events, or if the approaching vehicle is likely going to go through the intersection even after the traffic signal turned red and where the approaching vehicle should have stopped.

Similarly, a policy for restoring access to all or select features and functions of a user's mobile device would be executed following the determination of little or no V2V traffic having been detected for a predetermined amount of time. The policies may require a certain amount of time to pass before the restrictions are added or removed to ensure the change in traffic is sufficient to justify a reduction in risk and to eliminate the likelihood of an anomaly of no vehicles on an otherwise busy roadway. Other inputs and/or criteria can be used other than time for assessing the determination of reduced or increased risk based on detected V2V traffic. For example, this can include time of day/day of week to determine if it is rush hour, historical information such as previously recorded traffic information, updated location information including work zone or construction areas, and recent weather reports, etc.

In one example, V2V information may be utilized as input to policy restrictions on a distracting device for a package delivery driver and corresponding application process. In this example, the policy of the service company that employs the driver and/or the insurance carrier of the company that insures the company and its drivers may select to restrict the driver of that vehicle from being able to access or view the vehicle device or their user device when the vehicle is in motion and there is surrounding traffic detected. However, when it has been determined that there has been no traffic detected for a defined period of time or other factors, such as weather, road construction, etc., are no longer posing an elevated risk, the policy may change enable the driver to have limited or complete access to the vehicle or user device.

In the case of complete access, the driver would be able to access the vehicle device(s) to control vehicle systems and access the user device to view all messages, interact with all applications and be able to initiate and respond to communications including phone calls, text (SMS) or multimedia (MMS) messages, mobile applications, Internet browsing and/or corporate network access.

In the case of limited access, examples of driver restrictions could include, but are not limited to compound examples of multiple traffic restriction variables. The compound policies can be separated into separate policies and the combining of criteria into a compound policy is for illustrative purposes only. In one example, only incoming calls permitted from a dispatch center may be permitted when the vehicle is traveling at a speed under an example predetermined speed threshold, such as 50 kph or 30 mph.

Another example may provide displaying on the vehicle device or the user device screen select message details of messages that were previously delivered, such as only messages from the dispatch center and only whether the message is marked urgent, so that the driver can assess such information to decide if they need to pull over to view the full message and possibly respond, where the driver may at least be aware of such messages and make the decision to leave the roadway in order to view the detailed information and provide responses. Another example may provide access to select applications with limited capabilities, such as navigation applications where only pre-programmed addresses can be selected when the vehicle is in motion, or Internet radio where only select functions are accessible such as play, stop, next track, previous track. Another example provides enabling audible tones, canned messages or text-to-speech of all or select messages as such messages arrive or have been received.

There are typically six levels defined for automated driving such as in the SAE J3016 specification. Level zero is typically defined as no automation, and therefore the human driver is required all of the time for all tasks associated with driving. Level one is driver assistance, which implies the driver must be ready to take over at anytime from features such as parking assist, lane keeping assist and/or adaptive cruise control. Level two is partial automation, which enables a vehicle's automated systems to perform the driving functions including acceleration, braking and steering under limited circumstances with the driver ready to take control at any moment. In level three conditional automation provides that the vehicle can be in full control of driving in specific environments and situations where humans can then perform other tasks but can be requested to take control at any moment. Level four is high automation, which provides full vehicle control in most situations, however if a human driver does not respond to requests to intervene the vehicle will still be able to manage the situation, such as safely bringing the vehicle to rest. Finally, level five is full automation which implies no restrictions on automated driving with no human intervention required.

In all of the above levels of vehicle control autonomy, the driver is expected to be able to take control of the vehicle in some capacity except for level five full automation. For example, in levels 1-4 where there are partial levels of autonomy, the vehicle systems can at any moment request or require the driver to take control of the vehicle. As such, it is important that the driver be in a position both physically and mentally to assume control of the vehicle control systems. Physically, the driver must be able to take over the controls of the vehicle when indicated by the automated systems by placing their hands and feet on the controls and using their senses including eyes, ears and nose to cognitively process the situation and environment. The driver must also be knowledgeable and have experience driving a vehicle.

To be able to cognitively process the situation and environment may require time, particularly if the human driver is or has previously been immersed in other cognitive tasks such as playing a game, reading, watching a video, operating vehicle infotainment or control systems or composing a message on a mobile device. While the human driver may be in a position to quickly physically assume the controls of the vehicle, it may take more time for the human's cognitive abilities to reach a state where they can exercise sound judgement in how to handle the situation effectively to safely control the vehicle. The time from which the driver is alerted that they are needed to assume control, until the time they are both physically in control of the vehicle systems and cognitively able to exercise judgement, can be defined as the human driver refocus time (HDRT).

Alerts from the vehicle systems that the human driver is needed to take control should be greater than or equal to the HDRT to ensure safe transition and to not create additional risks. As a result, the autonomous vehicle control systems may use history, intelligence and algorithms/procedures to assess the right point in time at which to begin alerting the driver. If the time given from the start of the alert until the point where the human driver is needed is less than an established HDRT, a situation may exist where neither the autonomous controls nor the human driver are in control of the vehicle which could result in an accident.

The amount of time from which the autonomous vehicle control systems determine that the human driver is required to assume control must be at least the HDRT in order to ensure the vehicle remains in control. Also, the HDRT must be short enough that the transition can be made without added delays but also sufficient for the driver to be able to use good judgement in making the transition.

In a lower level automated driving scenario, such as level 1 or 2 control, the HDRT is expected to be short as the automated systems may have limited advance forecasting capabilities, and the driver is already aware of the required interaction. As the autonomy level increases such as level 3 or 4, it is possible to have additional forecasting capabilities as to when the driver must be alerted to assume control, such as awareness of upcoming weather, traffic, construction or physical road conditions, however this is not always the case since an emergency situation that the automated systems may not be able to handle can occur at any moment and may require more immediate takeover requirements. Furthermore, it is possible that autonomous control systems be programmed to delay alerting the driver to take over control until a specific moment, such as when the vehicle is about to enter an environment where the automated systems are not capable of controlling the vehicle. In this case, it is possible that the automated systems may delay this time for notification or prompting the driver.

Until a vehicle supports full autonomy, the driver is expected to be available to take control at anytime. Automated vehicles can interact with devices to alert the driver to operate the vehicle. The policy decision and/or algorithm to decide the specific point at which to alert the human driver can include information around distracted driving, such as whether or not the human driver is engaged with a mobile or distracting device at all and even what they are doing on the device, such as determining whether their actions are mind-intensive or of low brainpower impact. For example, a task that requires intense thought may require more time from which to disengage by the human driver before they can be considered wholly active at the vehicle controls. Similarly, if they are engaged in a less intense task, such as watching a short video clip, it may be sufficient to alert the user on the device itself that the vehicle may need driver intervention shortly. Such factors may be further determined based on historic information, driving record, demographic, age of the driver, and other factors which may fine tune the time for transition afforded to a particular driver. Such information may be retrieved from a driver profile and applied to the procedure used to determine such time-based restrictions.

Figure 6A:
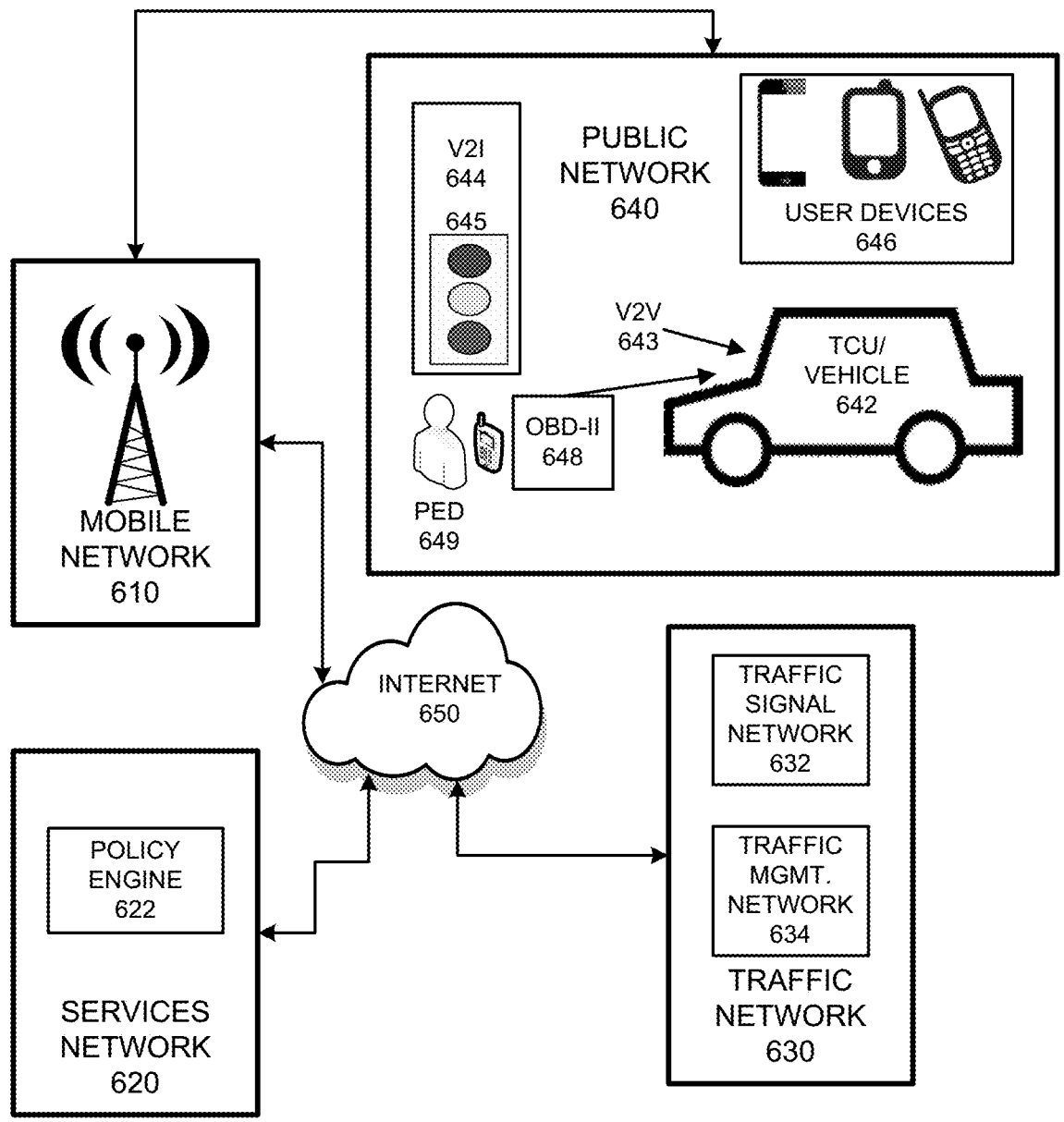
FIG. 6A illustrates a vehicle to infrastructure (V2I) network configuration according to example embodiments.

FIG. 6A illustrates a network configuration associated with the vehicle communication configurations of the example embodiments. Referring to FIG. 6A, the network 600 displays a system for enabling a traffic network 630 having traffic signal network data 632 and traffic management network information 634 to be communicatively coupled with a services network 620, which includes a policy engine 622, and which can be communicatively coupled with mobile and stationary devices 646 including but not limited to mobile phones, tablets, in-vehicle computer systems as well as with devices that may be connected to the vehicle's infotainment and control functions and related communications systems such as via an OBDII device 648 connected to an OBDII port in the vehicle 642 or to a telematics control unit in the vehicle.

The traffic network 630 may include the traffic signaling network 632 for operating traffic signals and a traffic management network 634 for managing the traffic signaling network 632 as well as other components of the traffic network 630 including other V2X components.

The services network 620 may contain the logic for invoking services to subscribers or users that may be owners or operators of vehicles. These subscribers or users may have mobile and stationary devices 646 including but not limited to mobile phones, tablets or in-vehicle computer systems that when utilized can distract the user when they are driving the vehicle, such as video and audio systems or computer applications on a mobile device or an in-vehicle head-unit. The services network may contain the policy engine 622, which can be queried for what action to take under a set of circumstances, such as when the user is located in a moving vehicle 642, when the user is operating or driving the vehicle, when the user is operating the vehicle but it is not moving such as when the vehicle is stopped at a traffic light 645, when the vehicle 642 is stopped with the power systems or engine still turned on, or when the vehicle is stopped with the power systems or engine turned off, or when the user is not in the vehicle.

The mobile network 610 can be a cellular network, a WiFi network or other short or long range communications network typically used to enable fixed or mobile devices to be communicatively coupled with other networks including the public switched telephone network (PSTN), the Internet and/or private networks. The vehicle may operate on a public right of way, which can be an interconnected network of roads on which a vehicle can be driven and recognized by any one or more of the sub-systems of the system network 600.

In the network 600, the four entities 610, 620, 630 and 640 can all be located separately and communicatively coupled via a public Internet or a private network, or instead can be co-located. For example, it is possible for the services network 620 to be located separate from the traffic network 630 and the mobile network 610, in a data center operated by a third party, such as an employer of a fleet of trucks, such as UPS or FEDEX, or an insurance carrier, or via a hosting agent that enables subscribers to make use of the services and policies. Equally the services network 620 can be co-located with the traffic network or the mobile network for some or all of the subscribers that utilize the traffic network or the mobile network. Furthermore, the policy engine 622 itself can be entirely co-located within the services network 620, or the policy engine 622 can be distributed such that all or part of the policy control functionality be located in a separate facility, such as at an enterprise or an insurance carrier or via a hosting agent.

Mobile phones, tablets or other mobile devices 646 can be located in the vehicle while traveling along the public right of way network 640. These mobile devices can be communicatively connected with the mobile network 610 using over-the-air communications technologies such as cellular or WiFi networks or other communications technologies based on radio frequency, light emission or other technologies.

Similarly, an OBDII module 648 plugged into the OBDII port on the vehicle 642 can be communicatively coupled with the mobile network or alternatively can be communicatively coupled with a mobile device in the vehicle through a fixed or wired connection or via a communications protocol such as WiFi or BLUETOOTH, enabling the OBDII device to interface with the Internet 650 to connect with the services network 620 and/or the traffic network 630. Alternatively, the OBDII device 648 can enable the mobile devices in the vehicle to be communicatively coupled with the Internet 150 or PSTN where the OBDII device supports a communications protocol such as WiFi or BLUETOOTH to connect with the mobile devices 646.

An onboard telematics control unit (TCU) can also be communicatively coupled with the mobile network 600 using a cellular, WiFi, satellite, light emission or other connection method, and enable in-vehicle mobile devices to be communicatively coupled to the Internet 650 and/or PSTN.

Vehicles equipped with V2V communication technology 643 can listen for and share information with other vehicles including but not limited to the vehicle's location at a particular time, direction of travel, speed, signal strength and/or intensity, vehicle characteristics, load information, etc. V2V information 643 from surrounding vehicles and V2P information 649 from surrounding pedestrians is captured and utilized to assess whether to activate or de-activate policies from the services network 620 to selectively or completely limit or unrestrict access to a device, such as devices 646 that can distract a driver.

A traffic light equipped with V2I communication technology 644 may be communicatively coupled with traffic network 630 via the mobile network 610 and the Internet 650. In this example, V2I information 644 from the traffic network 630 can be utilized by the services network 620 to assess whether to activate or de-activate policies to selectively or completely limit or unrestrict access to a device that can distract a driver.

Figure 6B:
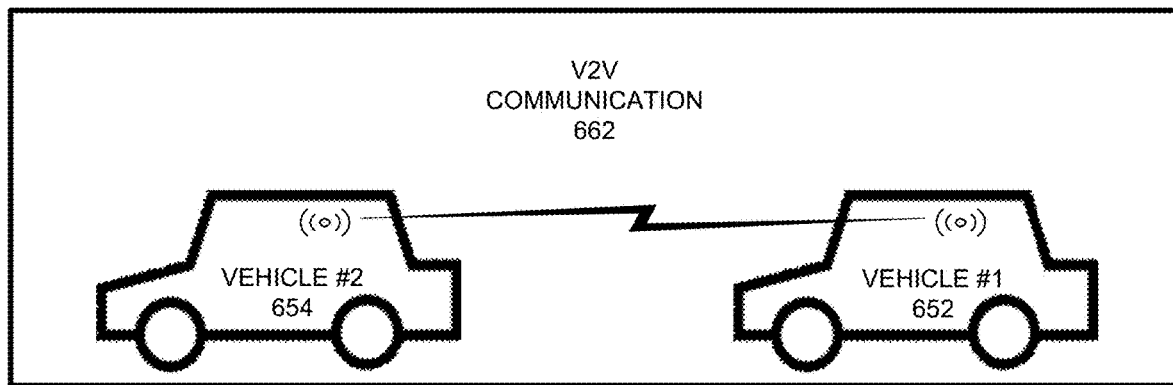
FIG. 6B illustrates a vehicle to infrastructure (V2V) configuration according to example embodiments.

FIG. 6B illustrates an example of V2V communication between two or more vehicles according to example embodiments. Referring to FIG. 6B, the example 660 provides for V2V communication 662 between two vehicles 652 and 654 via short-range communication radio antennas. This type of communication may be from one vehicle to another and may be transferred from one vehicle to many vehicles, which in turn share that information with other vehicles once the vehicles equipped with such communication technology are in range of one another.

Figure 6C:
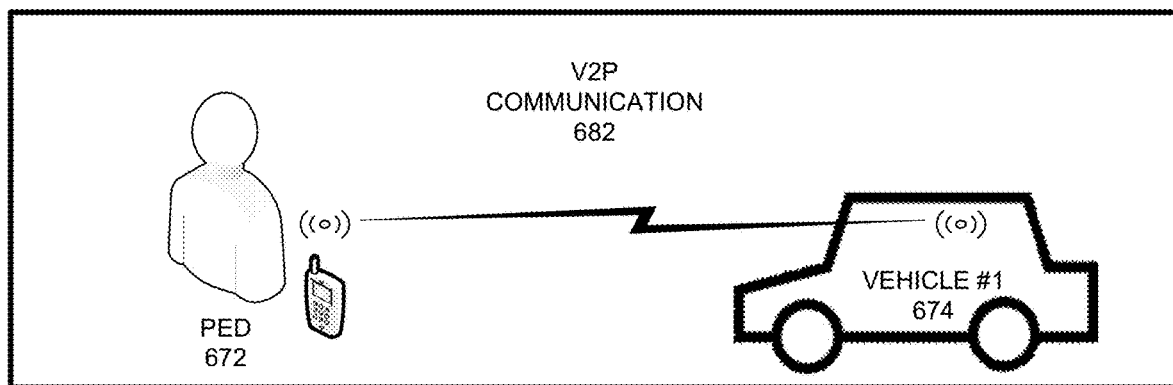
FIG. 6C illustrates an example of vehicle to pedestrian (V2P) communication between one or more pedestrians and one or more vehicles according to example embodiments.

FIG. 6C illustrates an example of V2P communication between one or more pedestrians and one or more vehicles according to example embodiments. Referring to FIG. 6C, the example 680 provides for V2V communication 682 between at least one pedestrian 672 and at least one vehicle 674 via short-range communication radio antennas. This type of communication may be from a pedestrian device to a vehicle and may be transferred from one vehicle to many vehicles, which in turn share that information with other vehicles once the vehicles equipped with such communication technology are in range of one another. Similarly, this type of communication may be from a vehicle to a pedestrian device and may be transferred from one pedestrian device to many pedestrian devices, which in turn share that information with other pedestrian devices once the pedestrian devices equipped with such communication technology are in range of one another.

Figure 7:
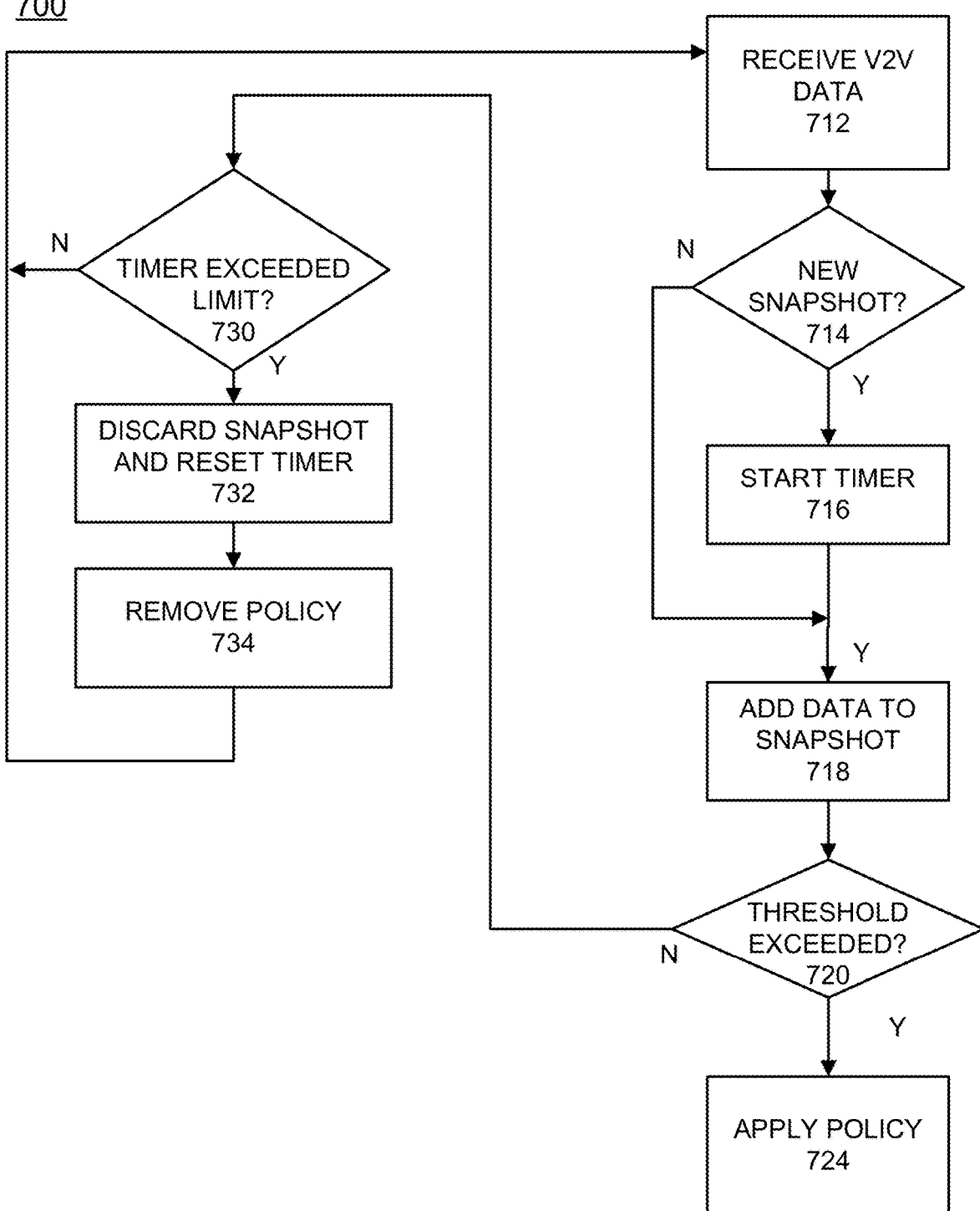
FIG. 7 illustrates a flow diagram of an example method of vehicle policy management for V2V configurations according to example embodiments.

FIG. 7 illustrates a V2V policy flow diagram 700 according to example embodiments. Referring to FIG. 7, the V2V data from surrounding vehicles 712 is captured and stored in the form of a snapshot of data, which may be a list of parameters in a file or other data format. The V2V data may include the surrounding vehicles' location at a particular time, direction of travel, speed, signal strength and/or intensity, vehicle characteristics, load information, etc. A determination is made 714 as to whether no previous snapshot exists, and if no, then the new data is stored 718. Otherwise if there is a previously known data snapshot, then a timer is started 716. Additional V2V data received is added to the snapshot in subsequent updates received according to a scheduled capture interval, such as every 30 milliseconds or seconds, etc.

The snapshot is then assessed against a threshold 720 to determine whether or not to invoke a restriction policy 724 on a distracting device (i.e., user device, in-vehicle entertainment device, etc.) that may be used or in the view of the driver of the vehicle. The threshold may include one or multiple variables from the snapshot data including but not limited to discrete or aggregate vehicle location at a particular time, direction of travel, vehicle speed, signal strength and/or intensity, vehicle characteristics, load information.

In the event that the threshold, as specified in the policy, has been exceeded, for example, the aggregate intensity information combined with the aggregate direction of travel information, collected from the snapshot and suggesting that there is a high level of traffic nearby to the vehicle in which the driver is operating the vehicle, and also where the traffic is traveling in the same or opposing direction, a restriction policy may be applied 724. The restriction policy may be one of completely or partially restricting access to the device such that all or selective features of the device are disabled or restricted from use by the driver, including all or selective aural or visual display of notifications. The determination as to whether to completely or partially restrict access to the device may be based on information in the snapshot such as intensity level and its relative strength compared to a threshold intensity level, or it may be based on other factors such as traffic data acquired from other sources such as GOOGLE traffic data, historical traffic data, weather conditions acquired at the vehicle device itself or from a weather station communicating to any device in communication with the vehicle, equipment to assess medical conditions of the driver, such as vital sign information, heart rate, alertness and/or eye focus, and/or time-of-day/day-of-week/holiday schedule, etc.

If sufficient time has passed since the timer was started and a timer threshold has been exceeded 730, where the amount of V2V data collected remains or has fallen below a threshold, for example, in the case where there is no longer any traffic detected on the road, then the snapshot is discarded, the timer is reset 732 and the restriction policy can then be removed 734. Any new V2V data received by the vehicle determination system will result in a new snapshot being created.

Figure 8:
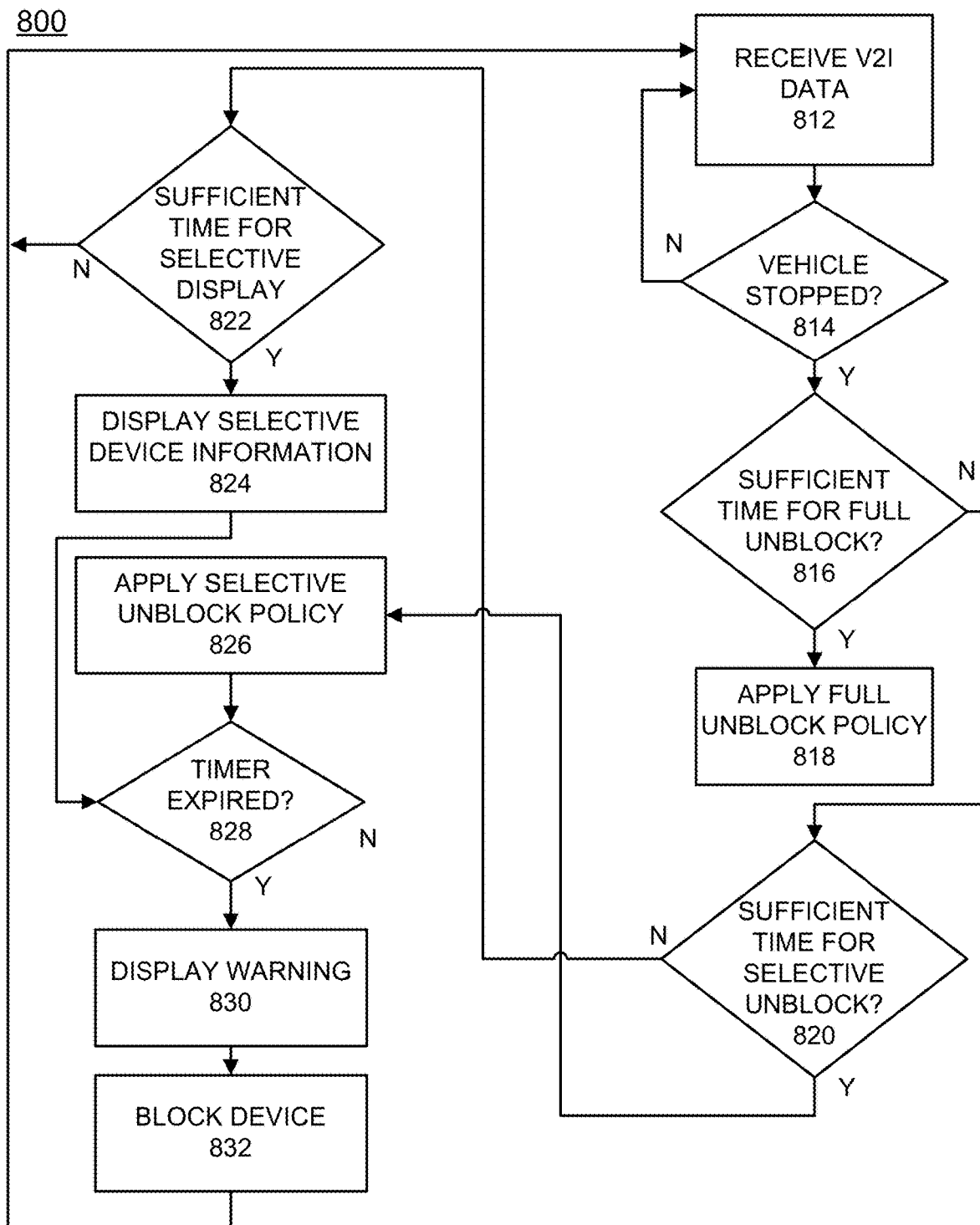
FIG. 8 illustrates a flow diagram of an example method of vehicle policy management for V2I configurations according to example embodiments.

FIG. 8 illustrates a V2I policy flow diagram 800 according to example embodiments. V2I data from a surrounding information sharing infrastructure may be captured and provided for vehicle processing purposes 812. The V2I data may include, but is not limited, to signaling (e.g., traffic light, speed limit, exit signage, etc.), construction zone data, road hazard data, toll data, traffic data, concession data, petrol or fuel data, charging station and/or weather information, etc.

In operation, if the vehicle is determined to be in motion 814 then the existing policy state is maintained and the system continues to monitor for V2X including V2I data. If the vehicle is determined to be stopped or below a specific speed threshold, then the system application checks to determine whether it has received V2I data from a nearby traffic signal, such as time-to-green data (TTG) indicating the remaining time until the traffic signal will change from red to green, after which the driver is permitted to accelerate, and at which point the distracting device(s) will be put into a restriction mode based on the policies for the driver. The policies can be the same for all drivers or can be different for each individual driver.

The system will then assess if there is sufficient time remaining for the driver to be permitted to access the distracting user device(s) 816. There may be different levels of unblock policies that may be based on factors such as TTG. In the example of FIG. 8, three different levels are shown including selective unblock, full unblock and selective display. The minimum time figures for these levels are denoted as minimum-time-selective-unblock (MTSU), minimum-time-full-unblock (MTFU), and minimum-time-selective-display (MTSD).

In the event that the TTG is greater than MTFU then the system may apply the full unblock policy 818 providing the driver with full access to the distracting device(s). Once the full unblock policy has been set, the system application checks if the TTG has expired. If the TTG has not expired, the system application continues to monitor the TTG. If the TTG has expired, the system application may display a warning 830 to the user indicating that the traffic light is going to change to green in a specific amount of time, for example in 10 seconds, or that the traffic light is changing to green now or that the traffic light has just changed to green. Note that the system application can also be set to provide the warning in advance of the light changing to green such as a five, ten or fifteen second advance notice. Once the timer has expired the block device policy is activated in order to apply the blocking policy to the distracting device(s). The block device policy can also be set to activate before the TTG expires and/or before the traffic light turns to green. For example, the system application can be set to provide a warning to the driver when TTG is at 15 seconds and then apply the block device policy when the TTG is at 5 seconds. In another example, it is possible for the system application to have a time-to-block (TTB) timer that may be set to the TTG plus a margin such as five or ten seconds where the driver is supplied with a warning based on the TTB instead of the TTG and/or where the block device policy is applied based on the TTB instead of the TTG. Using the TTB instead of the TTG provides a buffer of time between the time the device is blocked and the traffic light changes to green enabling the driver to resume physical and mental controls such that they are ready to be in control of the vehicle when the light has changed to green. The definition of the block device policy may be based on a single policy for all subscribers or users of the system application or may be specific to an individual driver. The system application then proceeds to monitor for incoming V2X including V2I data. If the TTG is not greater than the MTFB then the system application proceeds with the next check.

If the TTG is greater than MTSB then the system may determine that there is time for a selective display 822 and display selective information 824 by applying a partial or selective unblock policy 826 providing the driver with selective access to the distracting device(s). Partial unblock may enable the driver access to certain features and/or functions of the distracting device(s) while restricting other features and/or functions. For example, the driver may be given access to change navigation routing instructions, change a music station from a music application or view but not respond to a list of messages. The definition of the selective block policy may be based on a single policy for all subscribers or users of the system or may be specific to an individual driver. If TTG has expired 828, the system may display a warning 830 to the user indicating that the traffic light is going to change to green in a specific amount of time, for example in 10 seconds, or that the traffic light is changing to green now or that the traffic light has just changed to green. Note that the system application functions can also be set to provide the warning in advance of the traffic light changing to green, such as a five, ten or fifteen second advance notice. Once the timer has expired the block device policy 832 is activated in order to apply the blocking policy to the distracting device(s). The block device policy can also be set to activate before the TTG expires and/or before the traffic light turns to green. For example, the system application can be set to provide a warning to the driver when TTG is at 15 seconds and then apply the block device policy when the TTG is at 5 seconds. In another example, it is possible for the system application to have a time-to-block (TTB) counter timer that may be set to TTG plus a margin such as five or ten seconds where the driver is supplied with a warning based on the TTB instead of the TTG and/or where the block device policy is applied based on the TTB instead of the TTG. Using the TTB parameter instead of the TTG parameter provides a buffer of time between the time the device is blocked and the traffic light changes to green enabling the driver to resume physical and mental controls such that they are ready to be in control of the vehicle when the light has changed to green. The definition of the block device policy may be based on a single policy for all subscribers or users of the system application, or may be specific to an individual driver. The system application then proceeds to monitor for incoming V2X including V2I data. If the TTG is not greater than the MTSB then the system proceeds with the next check.

If the TTG is greater than the MTSD then the system application may apply the selective display policy providing the driver a selective view of information on the distracting device(s). Selective display may enable the driver to view certain features and/or functions of the distracting device(s) while restricting the ability to access the features and/or functions otherwise provided by the user device. For example, the driver may be provided with a list of messages that have been received since the last time they accessed the device and the list may contain all or only partial information from the message, such as only messages marked with a status of 'urgent', the sending party and the subject line, in the case of an e-mail, the sending party and the first line of characters from a text message or social media message, the calling party name or number of any calls that came in with an indication of whether a message was left, the title of the current and/or upcoming song that is being played, etc. These examples of selective display information can enable the driver to make a decision as to whether they need to pull over and stop the vehicle in a safe location in order to be provided access to the full information and access the features and functions of the device necessary to respond or take other actions. The definition of the selective display policy may be based on a single policy for all subscribers or users of the system application or may be specific to an individual driver. If the TTG has expired 828, the system may display a warning to the user 830 indicating that the traffic light is going to change to green in a specific amount of time, for example in 10 seconds, or that the traffic light is changing to green now or that the traffic light has just changed to green. Note that the system application can also be set to provide the warning in advance of the light changing to green such as a five, ten or fifteen second advance notice. Once the timer has expired the block device policy 832 is activated in order to apply the blocking policy to the distracting device(s). The block device policy can also be set to activate before the TTG expires and/or before the traffic light turns to green. For example, the system application can be set to provide a warning to the driver when the TTG is at 15 seconds and then apply the block device policy when the TTG is at 5 seconds.

In another example, it is possible for the system application to have a TTB timer that may be set to the TTG plus a margin such as five or ten seconds where the driver is supplied with a warning based on the TTB instead of just the TTG and/or where the block device policy is applied based on the TTB instead of the TTG. Using the TTB instead of the TTG provides a buffer of time between the time the device is blocked and the traffic light changes to green enabling the driver to resume physical and mental controls such that they are ready to be in control of the vehicle when the light has changed to green. The definition of the block device policy may be based on a single policy for all subscribers or users of the system application or may be specific to an individual driver. The system application then proceeds to monitor for incoming V2X including V2I data. If the TTG is not greater than the MTSB then the system maintains the state of the policy and continues to monitor for V2X including V2I data.

If V2I data has been received from a nearby traffic signal but the vehicle is not in a location where the traffic light is applicable then the policy may not be imposed. For example, if the vehicle is stopped on the side of the road near a traffic signal but not in line behind the stop line of the traffic signal, or the vehicle is located beyond the traffic signal, the system may elect not to impose a restriction policy.

Figure 9A:
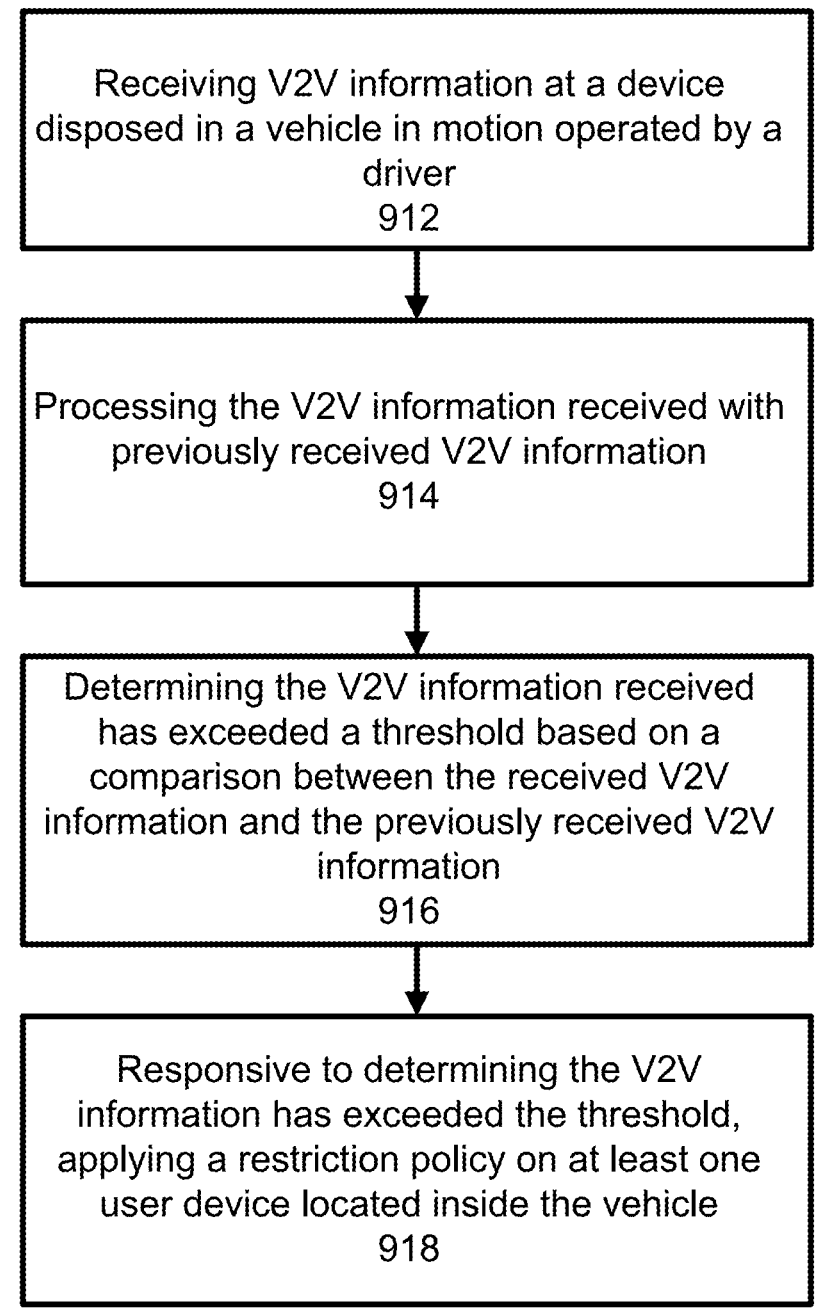
FIG. 9A illustrates an example method of operation using vehicle information according to example embodiments.

FIG. 9A illustrates an example method of operation 900 using vehicle information according to example embodiments. According to one example method of operation, a vehicle may receive V2V information and make determinations via a processing device associated with the vehicle. This method may provide receiving V2V information at a device disposed in a vehicle in motion operated by a driver 912, and processing the V2V information received with previously received V2V information 914. The method may also include determining the V2V information received has exceeded a threshold based on a comparison between the received V2V information and the previously received V2V information 916, and responsive to determining the V2V information has exceeded the threshold, applying a restriction policy on at least one user device located inside the vehicle 918. The new V2V information may indicate an increase in traffic, speed, etc., that the previously known V2V information did not indicate, which may cause a change in policy. The device is different from at least one user device. For example, the device may be a vehicle device as part of the vehicle. The vehicle device may also be the same as the user device.

Figure 9B:
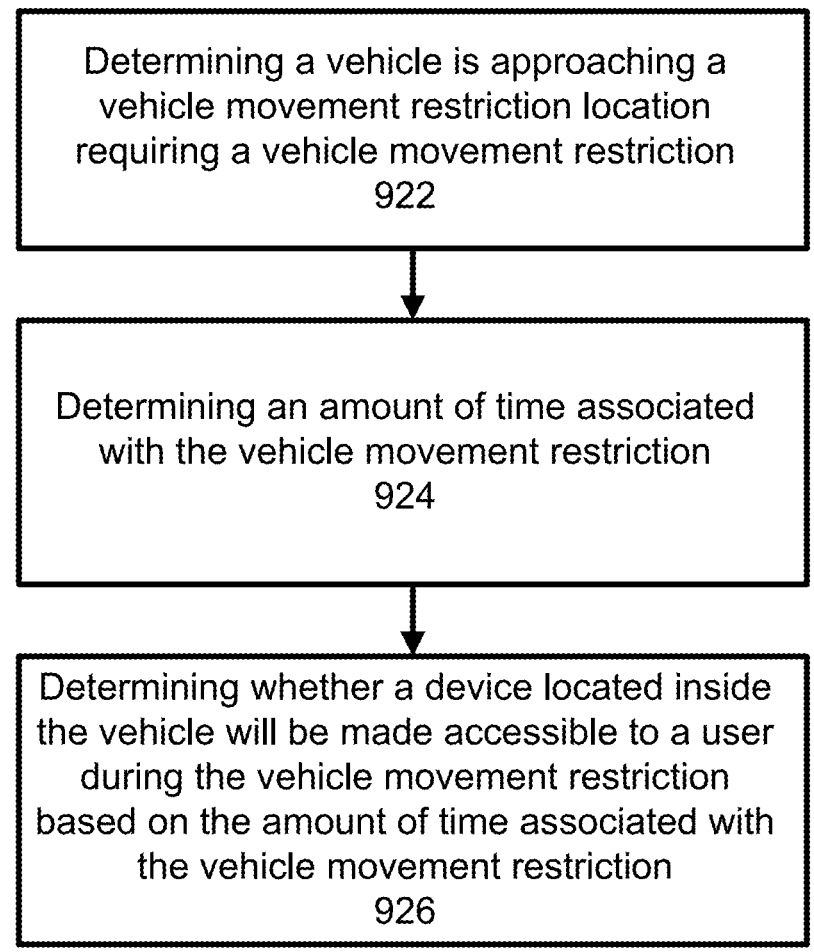
FIG. 9B illustrates another example method of operation using vehicle information according to example embodiments.

FIG. 9B illustrates an example method of operation 920 using vehicle information according to example embodiments. In another example embodiment, a method may provide determining a vehicle is approaching a vehicle movement restriction location requiring a vehicle movement restriction 922, such as a traffic light or construction zone, and determining an amount of time associated with the vehicle movement restriction 924, and determining whether a device located inside the vehicle will be made accessible to a user during the vehicle movement restriction based on the amount of time associated with the vehicle movement restriction 926. A decision may be made based on known parameters, known rules and applied logic to restrict the user device usage completely, partially and/or for a fixed period of time. The traffic restriction location may include a construction zone, a traffic light, a school zone, a designated low speed environment and a designated danger zone. The method may also include determining the vehicle is approaching the vehicle movement restriction location by determining a vehicle position via a global positioning system (GPS) location determination and/or a proximity between the traffic light and the vehicle. The method may also provide determining the amount of time is above a threshold amount of time, and responsive to determining the amount of time is above the threshold amount of time, providing limited access to the user device, determining the amount of time is above a threshold amount of time, and responsive to determining the amount of time is below the threshold amount of time, providing no access to the user device. The limited access to the user device includes at least one of a limited time window to receive and access communication messages including at least one of e-mail messages, short message service messages, multimedia message service, social media, vehicle infotainment or system and device application messages. The method may also include determining the vehicle movement restriction location comprises a known dangerous condition, and responsive to identifying the known dangerous condition, providing limited access to the device. The method may also include determining the vehicle movement restriction location comprises a known dangerous condition, and responsive to identifying the known dangerous condition, providing alert messages to the device.

Figure 9C:
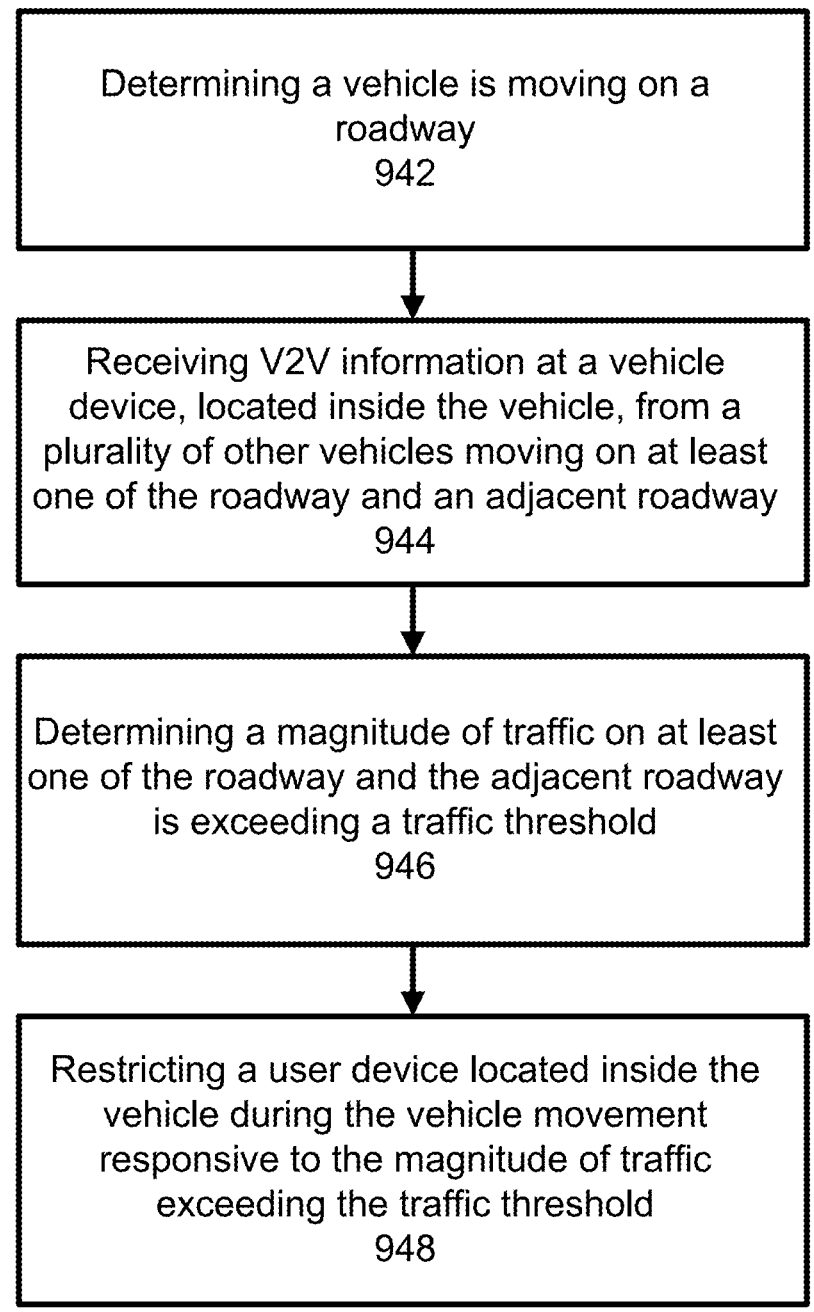
FIG. 9C illustrates another example method of operation using vehicle information according to example embodiments.

FIG. 9C illustrates an example method 940 of operation using vehicle information according to example embodiments. Another example embodiment may provide a method that includes determining a vehicle is moving on a roadway 942, receiving V2V information at a vehicle device, located inside the vehicle, from a plurality of other vehicles moving on at least one of the roadway and an adjacent roadway 944, determining a magnitude of traffic on at least one of the roadway and the adjacent roadway is exceeding a traffic threshold 946, and restricting a user device located inside the vehicle during the vehicle movement responsive to the magnitude of traffic exceeding the traffic threshold 948.

Figure 9D:
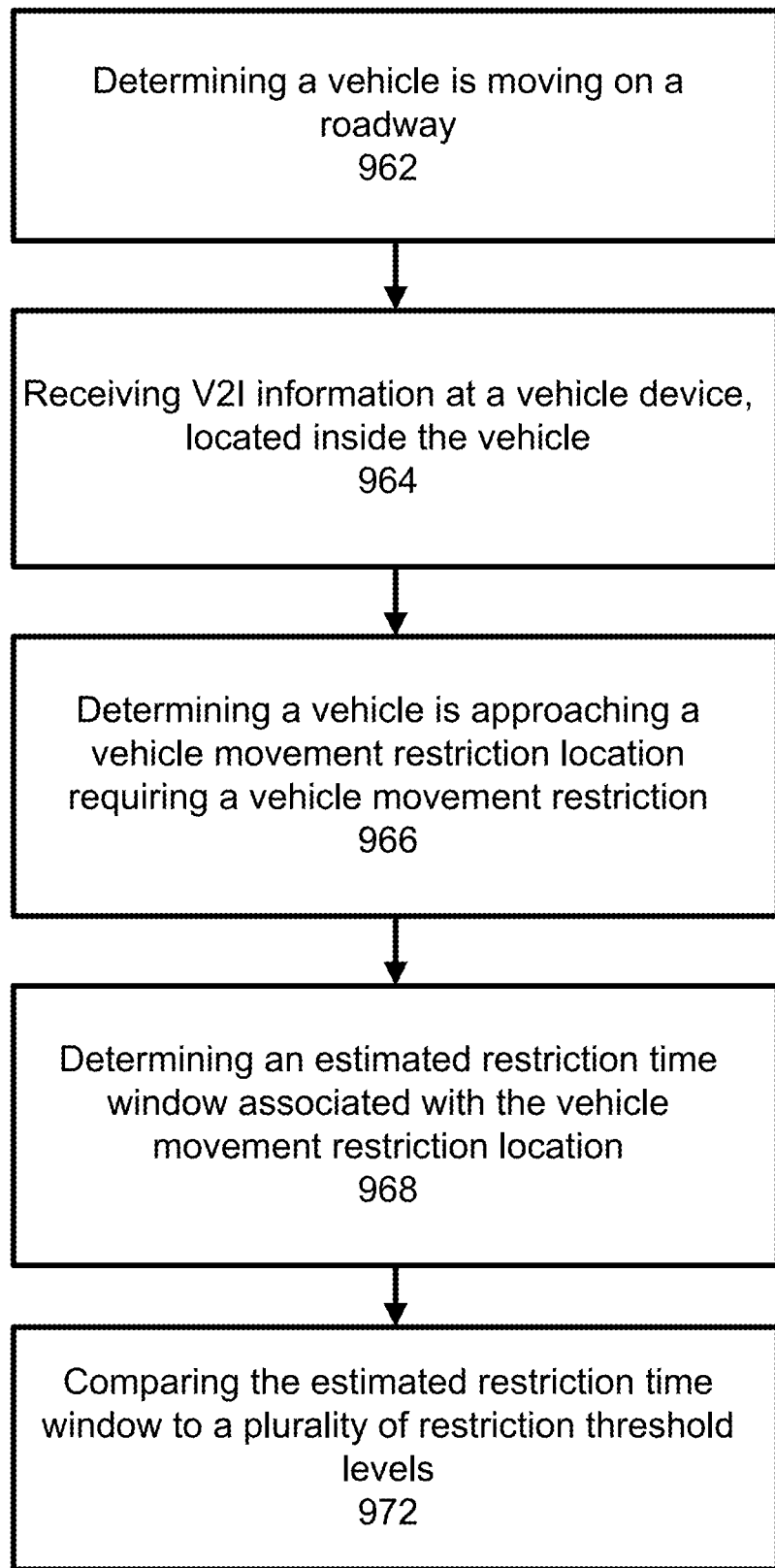
FIG. 9D illustrates another example method of operation using vehicle information according to example embodiments.

FIG. 9D illustrates an example method of operation 960 using vehicle information according to example embodiments. Still another example embodiment may include a method that provides determining a vehicle is moving on a roadway 962, receiving V2I information at a vehicle device, located inside the vehicle 964, determining a vehicle is approaching a vehicle movement restriction location requiring a vehicle movement restriction 966, determining an estimated restriction time window associated with the vehicle movement restriction location 968, comparing the estimated restriction time window to a plurality of restriction threshold levels 972, determining the restriction time window exceeds one of the restriction threshold levels and does not exceed one other of the restriction threshold levels, and partially restricting usage of a user device located inside the vehicle for at least a portion of the restriction time window. The method may also include determining whether a driver profile associated with the driver imposes additional restrictions, and when the driver profile imposes additional restrictions, further restricting the partially restricted usage of the user device. Also, the further restricting the partially restricted usage of the user device further includes restricting device usage to only one of multiple devices available to the user in the vehicle and restricting the usage to one or more predefined functions comprising navigation applications, emergency services notifications and emergency calling.

Figure 9E:
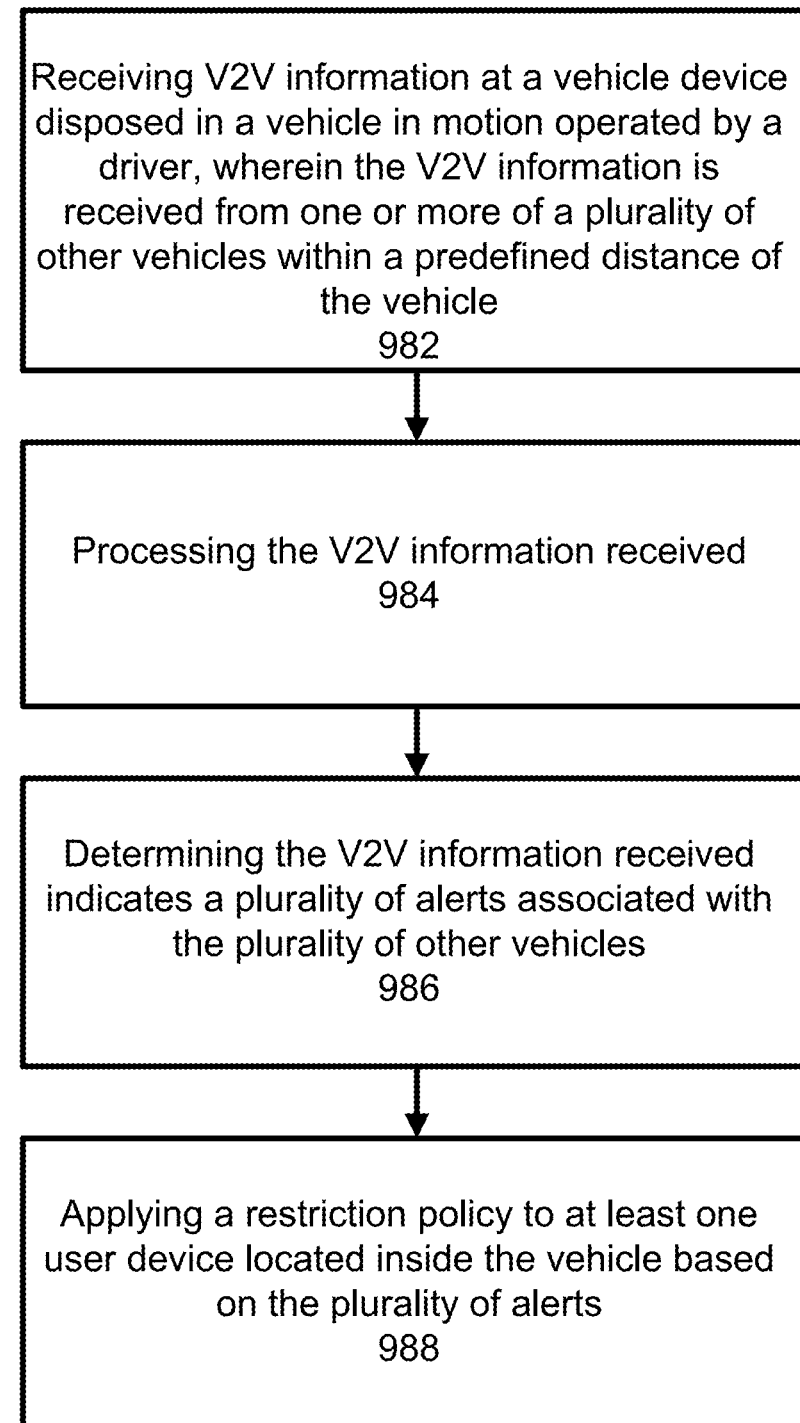
FIG. 9E illustrates another example method of operation using vehicle information according to example embodiments.

FIG. 9E illustrates an example method of operation 980 using vehicle information according to example embodiments. Still another example embodiment may include a method that includes receiving V2V information at a vehicle device disposed in a vehicle in motion operated by a driver 982, wherein the V2V information is received from one or more of a plurality of other vehicles within a predefined distance of the vehicle, processing the V2V information received 984, determining the V2V information received indicates a plurality of alerts associated with the plurality of other vehicles 986, applying a restriction policy to at least one user device located inside the vehicle based on the plurality of alerts 988. The plurality of alerts include at least one of a threshold amount of vehicle traffic identified by one or more of the plurality of other vehicles, a construction site identified by one or more of the plurality of other vehicles, and an emergency condition identifying by one or more of the plurality of other vehicles.

Figure 9F:
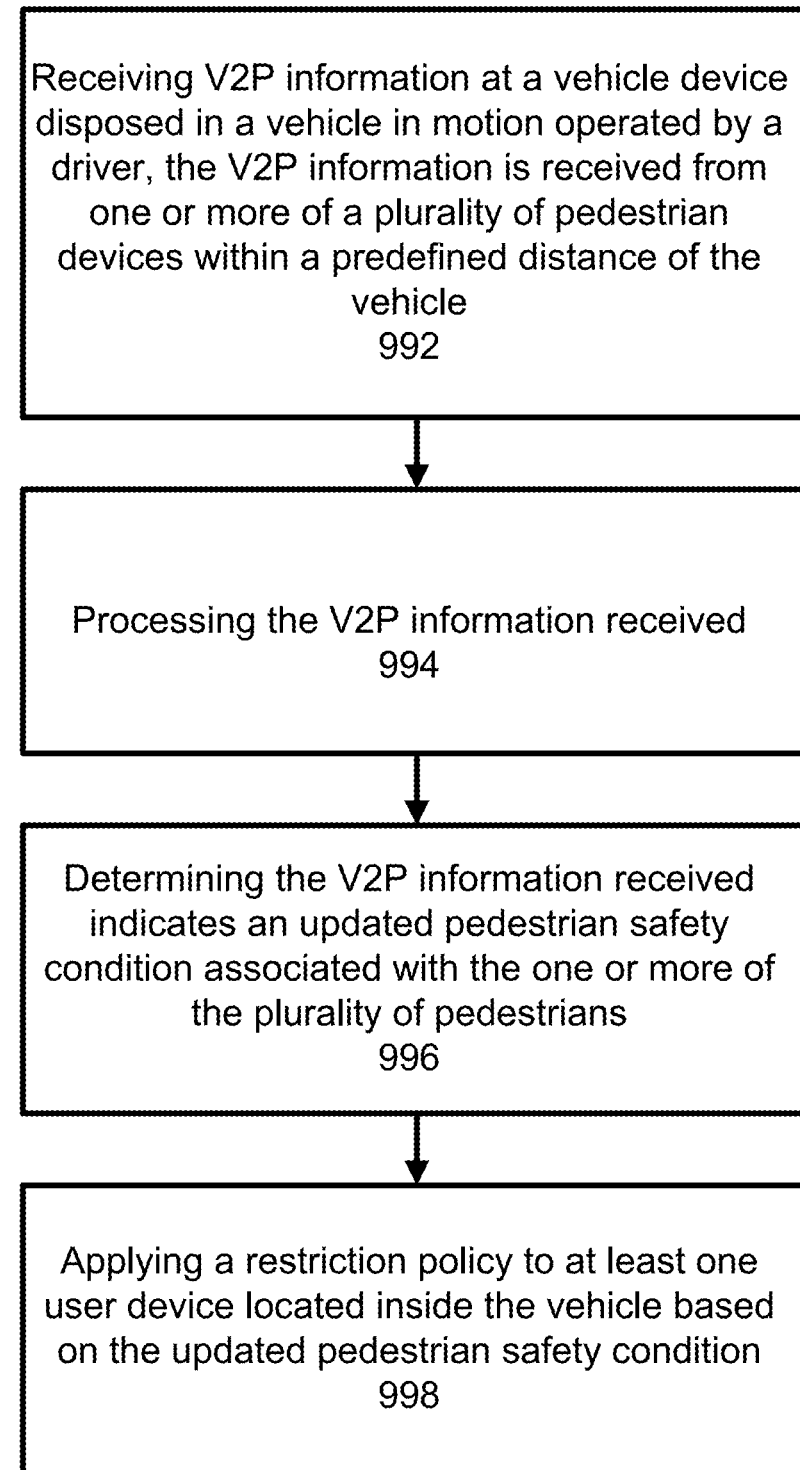
FIG. 9F illustrates still yet a further example method of operation using vehicle information and/or pedestrian information according to example embodiments.

FIG. 9F illustrates still yet a further example method of operation 990 using vehicle information and/or pedestrian information according to example embodiments. Still another example embodiment may include a method that includes receiving V2P information at a vehicle device disposed in a vehicle in motion operated by a driver 992, wherein the V2P information is received from one or more of a plurality of pedestrian devices within a predefined distance of the vehicle, processing the V2P information received 994, determining the V2P information received indicates an updated pedestrian safety condition associated with the one or more of the plurality of pedestrians 996, and applying a restriction policy to at least one device located inside the vehicle based on the updated pedestrian safety condition 998. The updated pedestrian safety condition may include at least one of a recent pedestrian appearance, such as a non-vehicle based pedestrian that recently entered an intersection associated with the vehicle device position. The pedestrian may be on foot, bicycle, motor-wheeled vehicle, and/or may have one or more identified safety concerns, such as blindness, deafness, exceeded or below safe age threshold (i.e., above 70 or below 13 years old), wheelchair usage, mental incapacity, etc. The fact that the pedestrian is present may be accentuated by the additional safety concerns, which may be enough of a scored condition to cause the vehicle device to be alerted, restricted, etc.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
in response to identifying that a vehicle has stopped at a traffic signal or that the vehicle is approaching the traffic signal at a speed that is at or below a threshold speed, determining a level of access to grant to a mobile device of a user based on a time-to-green (TTG) signal from the traffic signal, wherein the TTG signal indicates a time until the traffic signal changes from red to green,
wherein the determining the level of access to grant to the user further comprises:
based on the TTG signal, determining whether sufficient time exists to grant the user full access to the mobile device,
based on the TTG signal, determining whether sufficient time exists to grant the user partial access to the mobile device, or
based on the TTG signal, determining whether sufficient time exists to display selected information to the user without granting the user access to the mobile device;
granting the user the level of access that has been determined;
in response to the granting the user the level of access that has been determined, initiating a time-to-block (TTB) timer that adds a certain time to the time until the traffic signal changes from red to green; and
in response to an expiration of the TTB timer, blocking all access to the mobile device.

2. The method of claim 1, further comprising:
after granting the user the level of access that has been determined, continuously monitoring the TTG signal; and
in response to the TTG signal reaching a threshold value, displaying a warning to the user by the mobile device, wherein the warning comprises an indication of an amount of time remaining before the traffic signal changes to green.

3. The method of claim 2, further comprising:
blocking all access to the mobile device after the warning but before the traffic signal changes to green.

4. The method of claim 1, wherein the determining the level of access to grant to the user further comprises:
based on the TTG signal, determining that the sufficient time does not exist to grant the user the full access to the mobile device; and
in response to the determining that the sufficient time does not exist to grant the user the full access to the mobile device, carry out the determining whether sufficient time exists to grant the user the partial access to the mobile device.

5. The method of claim 4, wherein the determining the level of access to grant to the user further comprises:
based on the TTG signal, determining that the sufficient time does not exist to grant the user the partial access to the mobile device; and
in response to the determining that the sufficient time does not exist to grant the user the partial access to the mobile device, carry out the determining whether sufficient time exists to display the selected information to the user.

6. The method of claim 1, wherein the partial access comprises:
limiting a time window to receive and access communication messages comprising at least one of:
e-mail messages, short message service messages, a multimedia message service, social media, vehicle infotainment or system messages, or mobile device application messages.

7. The method of claim 1, further comprising:
identifying that a location is associated with a known dangerous condition; and
sending an alert to the mobile device in response to the known dangerous condition being identified.

8. An apparatus, comprising:
a processor configured to execute instructions stored in a memory to configure the processor to:
in response to identification that a vehicle has stopped at a traffic signal or identification that the vehicle approaches the traffic signal at a speed that is at or below a threshold speed, determine a level of access to grant to a mobile device of a user based on a time-to-green (TTG) signal from the traffic signal, wherein the TTG signal indicates a time until the traffic signal changes from red to green,
wherein when the processor determines the level of access to grant to the user, the processor is further configured to:
based on the TTG signal, determine whether sufficient time exists to grant the user full access to the mobile device, based on the TTG signal, determine whether sufficient time exists to grant the user partial access to the mobile device, or based on the TTG signal, determine whether sufficient time exists to display selected information to the user without the user access to the mobile device being granted; and grant the user the level of access that has been determined;

in response to the level of access that has been determined being granted to the user, initiate a time-to-block (TTB) timer that adds a certain time to the time until the traffic signal changes from red to green; and in response to an expiration of the TTB timer, block all access to the mobile device.

9. The apparatus of claim 8, wherein the processor is further configured to:

after granting the user the level of access that has been determined, continuously monitor the TTG signal; and in response to the TTG signal reaching a threshold value, display a warning to the user by the mobile device, wherein the warning comprises an indication of an amount of time remaining before the traffic signal changes to green.

10. The apparatus of claim 9, wherein the processor is further configured to:

blocking all access to the mobile device after the warning but before the traffic signal changes to green.

11. The apparatus of claim 8, wherein when the processor is configured to determine the level of access to grant the user, the processor is further configured to:

based on the TTG signal, determine that the sufficient time does not exist to grant the user the full access to the mobile device; and in response to it being determined that the sufficient time does not exist to grant the user the full access to the mobile device, the processor is further configured to determine whether the sufficient time exists to grant the user the partial access to the mobile.

12. The apparatus of claim 8, wherein when the processor is configured to determine the level of access to grant the user, the processor is further configured to:

based on the TTG signal, determining that the sufficient time does not exist to grant the user the partial access to the mobile device; and in response to it being determined that the sufficient time does not exist to grant the user the partial access to the mobile device, determine whether the sufficient time exists to display the selected information to the user.

13. The apparatus of claim 12, wherein when the processor grants the partial access to the mobile device, the processor is further configured to limit access to at least one of:

e-mail messages, short message service messages, a multimedia message service, social media, vehicle infotainment or system messages, or mobile device application messages.

14. The apparatus of claim 8, wherein the processor is further configured to:

identify that a location is associated with a known dangerous condition; and send an alert to the mobile device in response to the known dangerous condition being identified.

15. A non-transitory computer-readable storage medium storing instructions that, when executed by a processor, configure the processor to perform:

in response to identifying that a vehicle has stopped at a traffic signal or that the vehicle is approaching the traffic signal at a speed that is at or below a threshold speed, determining a level of access to grant to a mobile device of a user based on a time-to-green (TTG) signal from the traffic signal, wherein the TTG signal indicates a time until the traffic signal changes from red to green, wherein the determining the level of access to grant to the user further comprises:

based on the TTG signal, determining whether sufficient time exists to grant the user full access to the mobile device, based on the TTG signal, determining whether sufficient time exists to grant the user partial access to the mobile device, or based on the TTG signal, determining whether sufficient time exists to display selected information to the user without granting the user access to the mobile device; and granting the user the level of access that has been determined;

in response to the granting the user the level of access that has been determined, initiating a time-to-block (TTB) timer that adds a certain time to the time until the traffic signal changes from red to green; and in response to an expiration of the TTB timer, blocking all access to the mobile device.

16. The non-transitory computer-readable storage medium of claim 15, wherein the instructions further configure the processor to perform:

after granting the user the level of access that has been determined, continuously monitoring the TTG signal; and in response to the TTG signal reaching a threshold value, displaying a warning to the user by the mobile device, wherein the warning comprises an indication of an amount of time remaining before the traffic signal changes to green.

17. The non-transitory computer-readable storage medium of claim 15, wherein the determining the level of access to grant to the user further comprises:

based on the TTG signal, determining that the sufficient time does not exist to grant the user full access to the mobile device; and in response to the determining that the sufficient time does not exist to grant the user full access to the mobile device, carry out the determining whether sufficient time exists to grant the user partial access to the mobile device.

18. The non-transitory computer-readable storage medium of claim 15, wherein the determining the level of access to grant to the user further comprises:

based on the TTG signal, determining that the sufficient time does not exist to grant the user partial access to the mobile device; and in response to the determining that the sufficient time does not exist to grant the user partial access to the mobile device, carry out the determining whether sufficient time exists to display the selected information to the user.

* * * * *